(12) United States Patent
Lee et al.

(10) Patent No.: US 10,761,763 B2
(45) Date of Patent: Sep. 1, 2020

(54) CACHE BUFFER AND SEMICONDUCTOR MEMORY DEVICE HAVING THE SAME

(71) Applicant: SK hynix Inc., Gyeonggi-do (KR)

(72) Inventors: KangYoul Lee, Daejeon (KR); Kyeong Min Chae, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 16/380,361

(22) Filed: Apr. 10, 2019

(65) Prior Publication Data

US 2020/0057574 A1 Feb. 20, 2020

(30) Foreign Application Priority Data

Aug. 16, 2018 (KR) .......................... 10-2018-0095753

(51) Int. Cl.
*G11C 16/08* (2006.01)
*G06F 3/06* (2006.01)

(52) U.S. Cl.
CPC .......... *G06F 3/0647* (2013.01); *G06F 3/0619* (2013.01); *G06F 3/0683* (2013.01)

(58) Field of Classification Search
CPC ..... G06F 12/0802; G11C 16/08; G11C 16/10; G11C 16/16; G11C 16/26; G11C 29/802
See application file for complete search history.

(56) References Cited

U.S. PATENT DOCUMENTS

| 9,767,863 | B2 * | 9/2017 | Katayama | ............... G11C 7/065 |
| 2011/0161567 | A1 * | 6/2011 | Song | .................... G06F 12/0246 711/103 |
| 2012/0236661 | A1 * | 9/2012 | Fukuda | .................. G11C 7/222 365/189.14 |
| 2013/0155794 | A1 * | 6/2013 | Wu | ....................... G11C 29/802 365/200 |
| 2017/0337130 | A1 * | 11/2017 | Chun | .................. G06F 12/0802 |

FOREIGN PATENT DOCUMENTS

KR 10-0856122 9/2008

* cited by examiner

*Primary Examiner* — Ryan Bertram
*Assistant Examiner* — Trang K Ta
(74) *Attorney, Agent, or Firm* — IP & T Group LLP

(57) ABSTRACT

A cache buffer coupled to a page buffer includes: a first cache group and a second cache group corresponding to a first area and a second area of a memory cell array; a selector coupled to the first and second cache groups; and an input/output (I/O) controller coupled to the selector and configured to output data to the first and second cache groups or receive data input from the first and second cache groups. The selector: performs normal repair operation by transferring data received through a first data line to the first cache group and transferring data received through a second data line to the second cache group; performs cross repair operation by transferring data received through the first data line to the second cache group and transferring data received through the second data line to the first cache group.

23 Claims, 21 Drawing Sheets

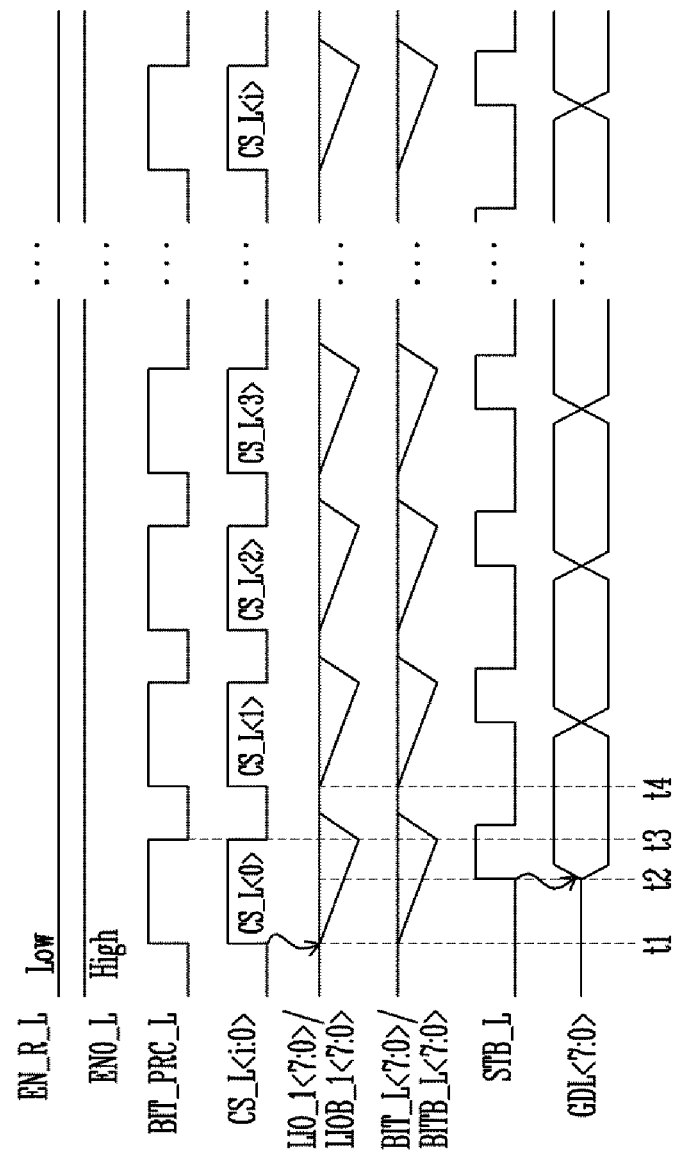

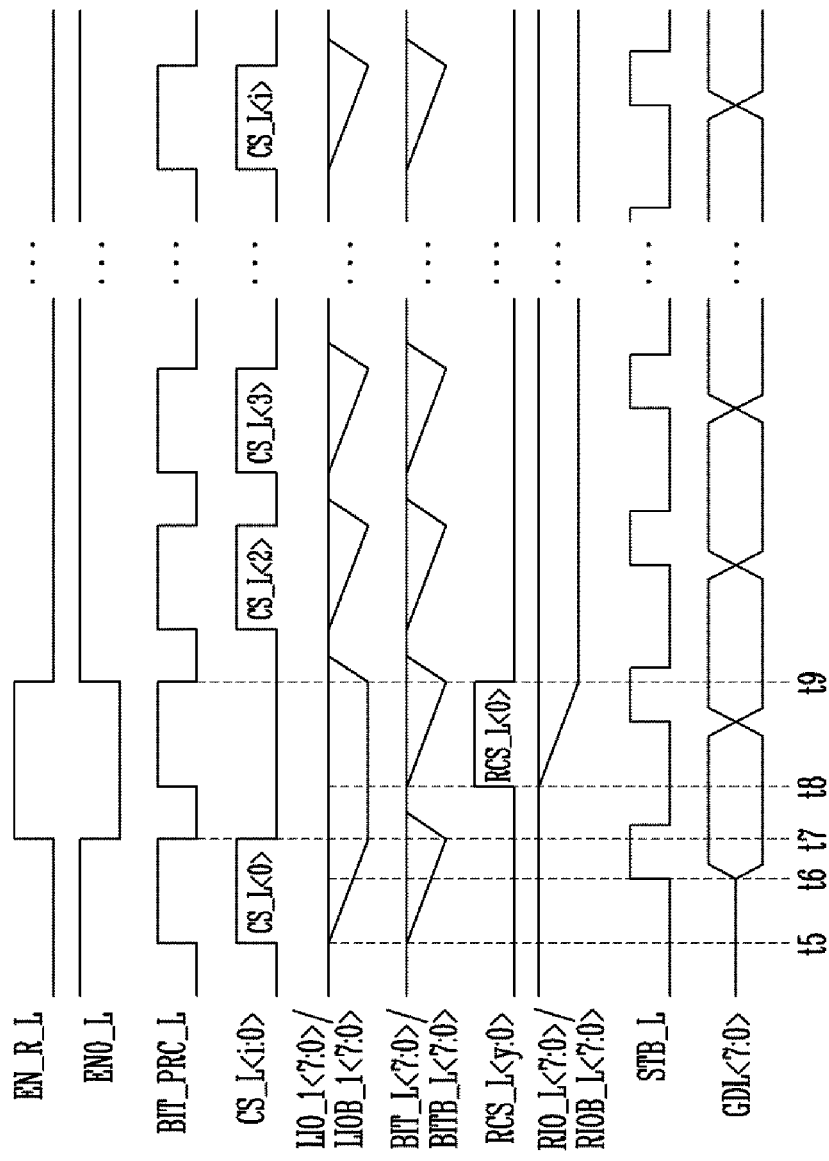

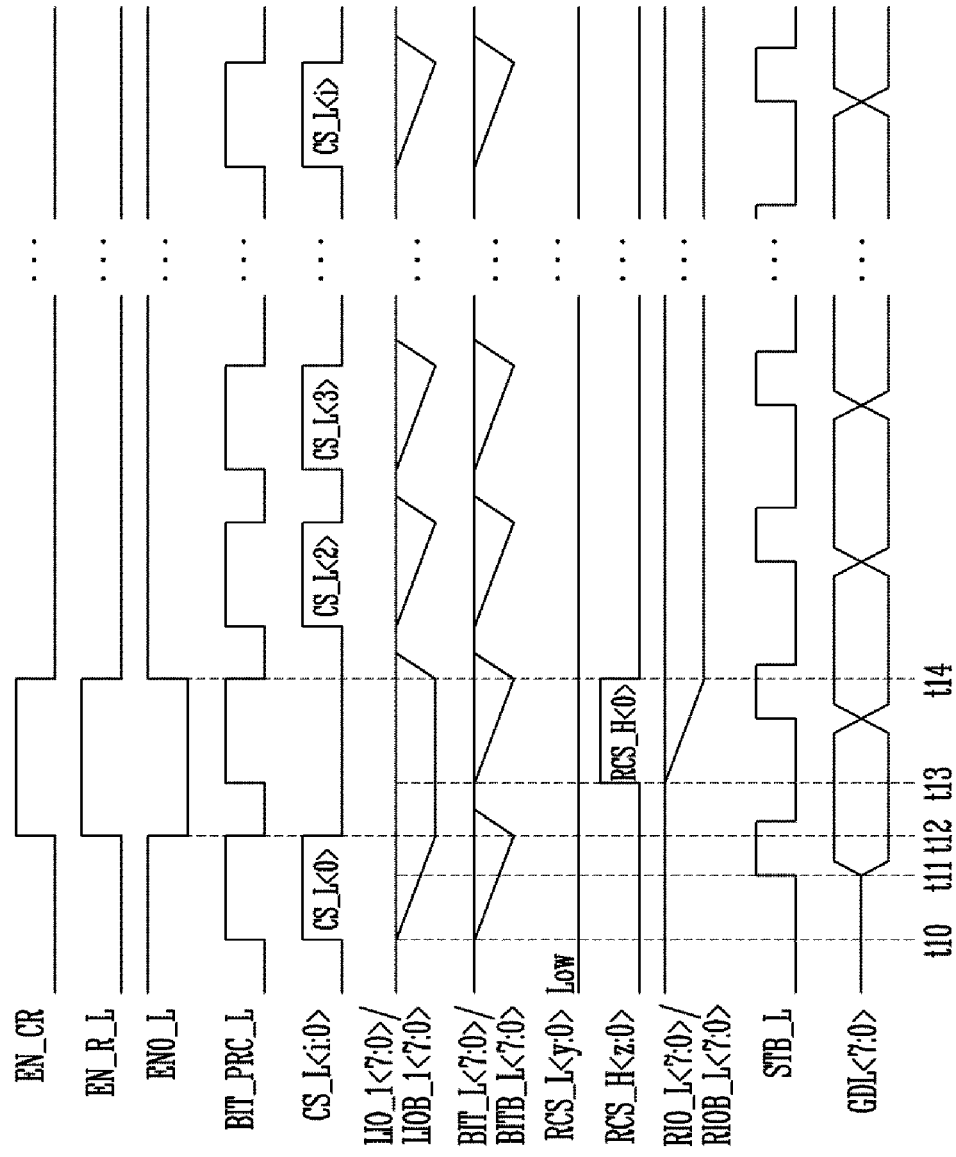

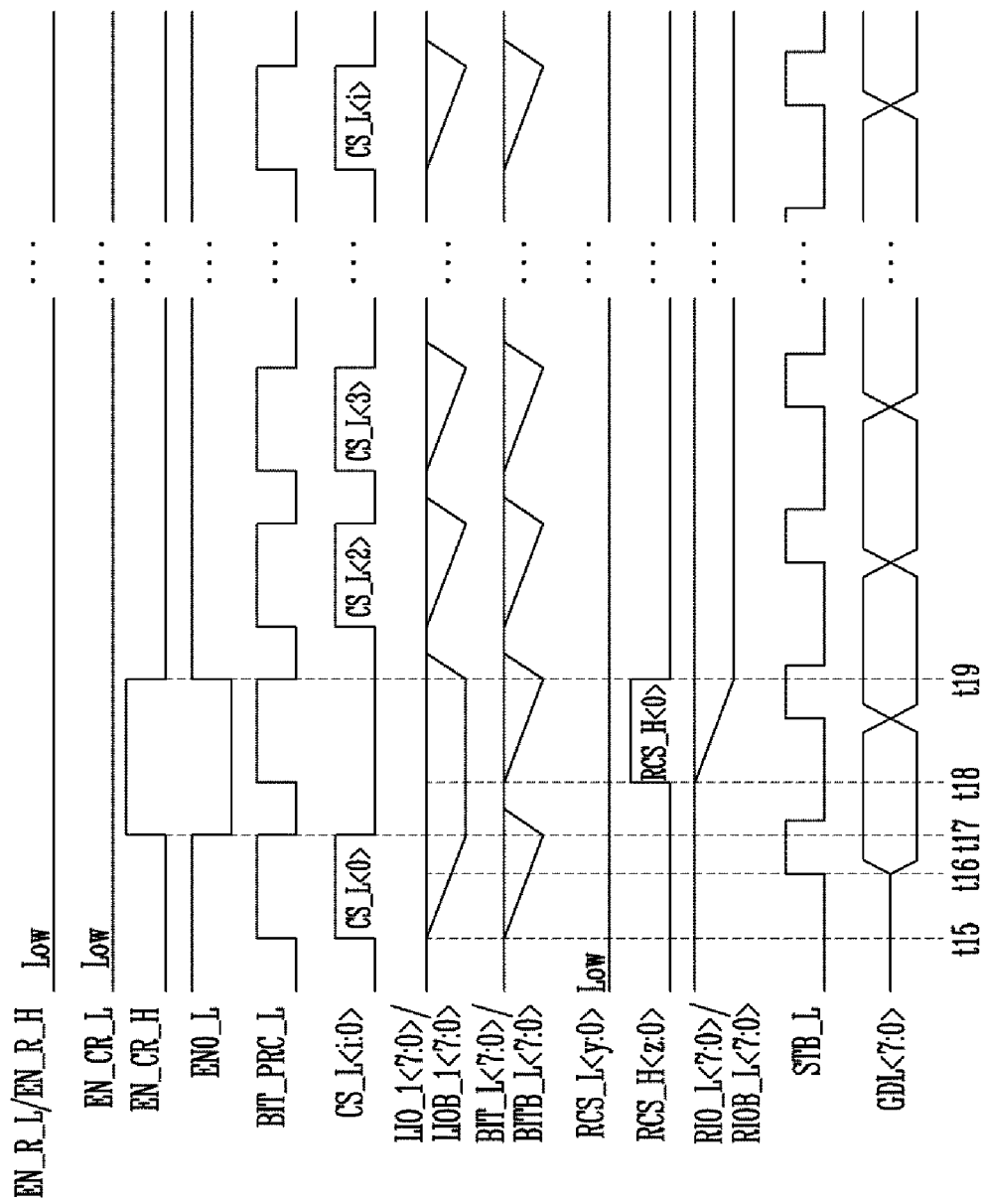

US 10,761,763 B2

CACHE BUFFER AND SEMICONDUCTOR MEMORY DEVICE HAVING THE SAME

CROSS-REFERENCE TO RELATED APPLICATION

The present application claims priority under 35 U.S.C. § 119(a) to Korean patent application number 10-2018-0095753, filed on Aug. 16, 2018, which is incorporated herein by reference in its entirety.

BACKGROUND

Field of Invention

The present disclosure generally relates to an electronic device, and more particularly, to a cache buffer and a semiconductor memory device having the same.

Description of Related Art

Memory devices may be formed in a two-dimensional structure in which strings are arranged horizontally to a semiconductor substrate, or be formed in a three-dimensional structure in which strings are arranged vertically to a semiconductor substrate. A three-dimensional semiconductor device was devised in order to overcome the limit of degree of integration in two-dimensional semiconductor devices, and may include a plurality of memory cells vertically stacked on a semiconductor substrate.

SUMMARY

Embodiments provide a cache buffer capable of flexibly performing a repair operation.

Embodiments also provide a semiconductor memory device capable of flexibly performing a repair operation.

In accordance with an aspect of the present disclosure, there is provided a cache buffer coupled to a page buffer, the cache buffer including: a first cache group corresponding to a first area of a memory cell array; a second cache group corresponding to a second area of the memory cell array; a selector coupled to the first cache group and the second cache group; and an input/output (I/O) controller coupled to the selector and configured to output data to the first cache group and the second cache group or receive data input from the first cache group and the second cache group, wherein the selector: performs normal repair operation by transferring data received through a first data line to the first cache group and transferring data received through a second data line to the second cache group; and performs cross repair operation by transferring data received through the first data line to the second cache group and transferring data received through the second data line to the first cache group.

In accordance with another aspect of the present disclosure, there is provided a semiconductor memory device including: a memory cell array including a plurality of memory cells; a page buffer configured to perform a program operation or read operation on the memory cell array; and a cache buffer coupled to the page buffer, wherein the cache buffer includes: a first cache group corresponding to a first area of the memory cell array; a second cache group corresponding to a second area of the memory cell array; a selector coupled to the first cache group and the second cache group; and an input/output (I/O) controller coupled to the selector and configured to output data to the first cache group and the second cache group or receive data input from the first cache group and the second cache group through the selector, wherein the selector: performs normal repair operation by transferring data received through a first data line to the first cache group and transferring data received through a second data line to the second cache group; and performs cross repair operation by transferring data received through the first data line to the second cache group and transferring data received through the second data line to the first cache group.

In accordance with another aspect of the present disclosure, there is provided a cache buffer coupled to a memory cell array, the cache buffer comprising: a main cache unit configured to cache data of a main memory area within the memory cell array; a first repair cache unit configured to cache data of a first repair memory area within the memory cell array; a second repair cache unit configured to cache data of a second repair memory area within the memory cell array; and an I/O control component configured to: transfer, when the main memory area is available, data through a first path between the main cache unit and an external entity; change the first path to a second path between the first repair cache unit and the external entity during a normal repair operation performed to repair the main memory area with the first repair memory area; and change the first path to a third path between the second repair cache unit and the external entity during a cross repair operation performed to repair the main memory area with the second repair memory area.

BRIEF DESCRIPTION OF THE DRAWINGS

Various embodiments will now be described more fully with reference to the accompanying drawings; however, elements and features of the present invention may be configured or arranged differently than disclosed herein. Thus, the present invention is not limited to the embodiments set forth herein. Rather, these embodiments are provided so that this disclosure is thorough and complete and fully conveys the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout. Also, throughout the specification, reference to "an embodiment," "another embodiment" or the like is not necessarily to only one embodiment, and different references to any such term is not necessarily to the same embodiment(s).

FIG. 13 is a timing diagram illustrating a data output operation of the cache buffer of FIG. 7 when repair is not performed in accordance with an embodiment of the present disclosure.

FIG. 14 is a timing diagram illustrating a method of performing a normal repair operation on a memory block in the main cache group in accordance with an embodiment of the present disclosure.

FIG. 15 is a timing diagram illustrating a cross repair operation in accordance with an embodiment of the present disclosure.

FIG. 21 is a timing diagram illustrating a cross repair operation of the cache buffer shown in FIG. 17 in accordance with an embodiment of the present disclosure.

DETAILED DESCRIPTION

Figure 1:
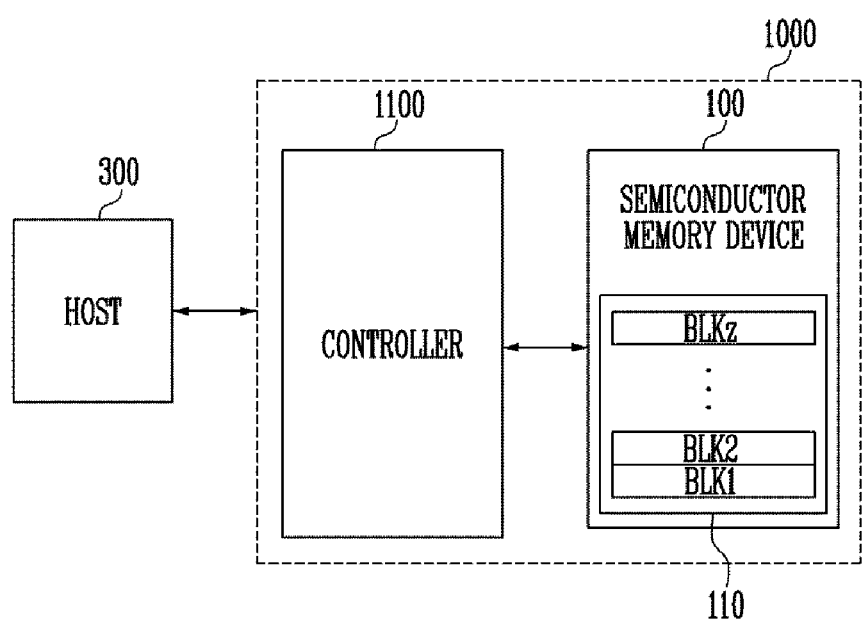
FIG. 1 is a block diagram illustrating a memory system.

In the present disclosure, advantages, features and methods for achieving them will become more apparent after a reading of the following embodiments taken in conjunction with the drawings. The present disclosure may, however, be embodied in different forms and should not be construed as being limited to the embodiments set forth herein. Rather, these embodiments are provided to describe the present invention in detail to the extent that those skilled in the art to which the disclosure pertains may easily practice the present invention.

In the entire specification, when an element is referred to as being "connected" or "coupled" to another element, it can be directly connected or coupled to the another element or be indirectly connected or coupled to the another element with one or more intervening elements interposed therebetween. Communication between two elements, whether directly or indirectly connected/coupled, may be wired or wireless, unless the context indicates otherwise. In addition, when an element is referred to as "including" a component, this indicates that the element may further include one or more other components instead of excluding such other component(s), unless the context indicates otherwise.

In describing embodiments of the present disclosure with reference to the accompanying drawings, the same reference numerals are used to designate the same elements in different drawings. In the following description, well known technical detail may be omitted from the following description so as not to unnecessarily obscure the present invention.

FIG. 1 is a block diagram illustrating a memory system.

Referring to FIG. 1, the memory system 1000 includes a semiconductor memory device 100 and a controller 1100. Also, the memory system 1000 communicates with a host 300. The semiconductor memory device 100 includes a memory cell array 110, and the memory cell array 110 includes a plurality of memory blocks BLK1, BLK2, . . . , and BLKz. The controller 1100 controls an operation of the semiconductor memory device 100 in response to a command received from the host 300.

Figure 2:
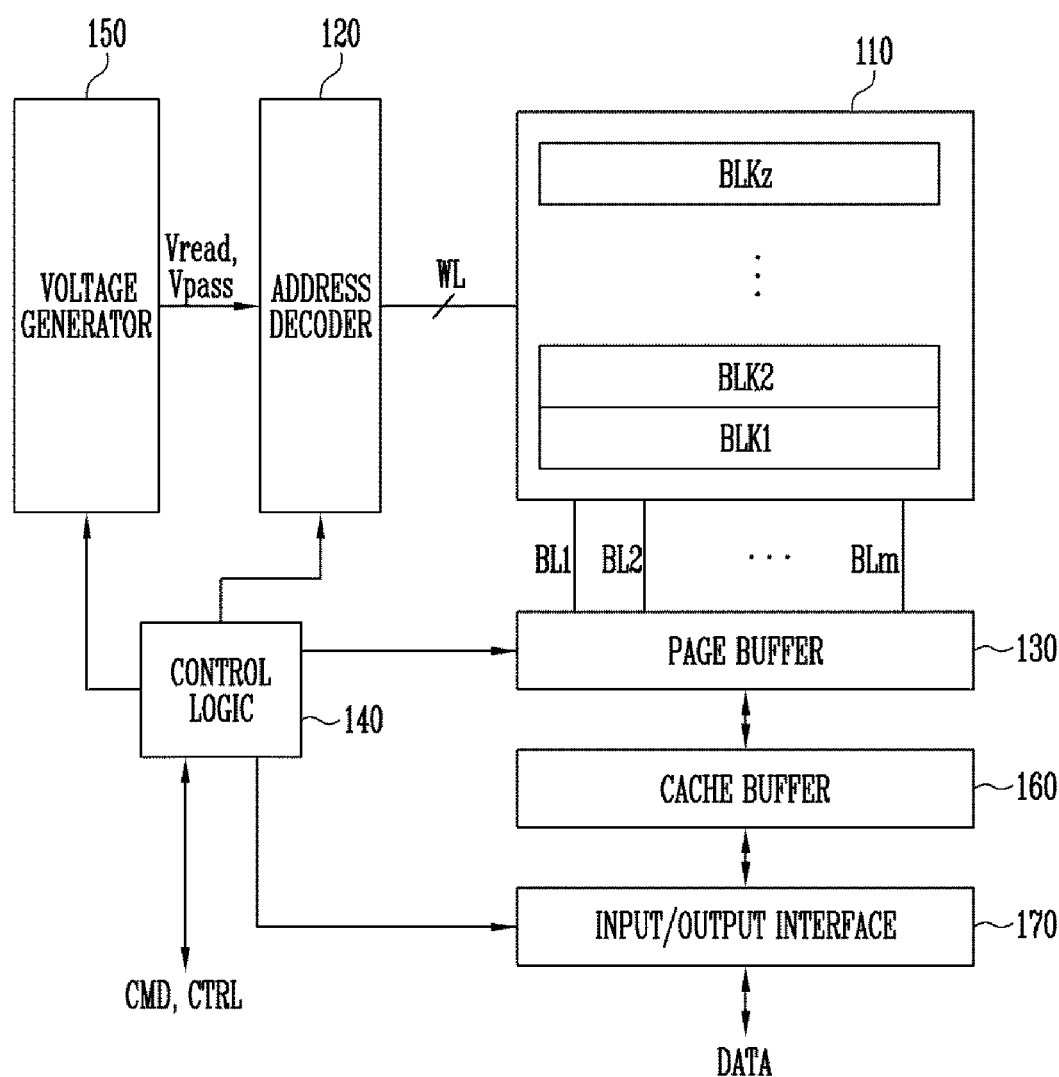
FIG. 2 is a block diagram illustrating a semiconductor memory device in accordance with an embodiment of the present disclosure.

FIG. 2 is a block diagram illustrating the semiconductor memory device of FIG. 1.

Referring to FIG. 2, the semiconductor memory device 100 includes a memory cell array 110, an address decoder 120, a page buffer 130, a control logic 140, a voltage generator 150, a cache buffer 160, and an input/output interface 170.

The memory cell array 110 includes a plurality of memory blocks BLK1 to BLKz. The plurality of memory blocks BLK1 to BLKz are coupled to the address decoder 120 through word lines WL. The plurality of memory blocks BLK1 to BLKz are coupled to the page buffer 130 through bit lines BL1 to BLm. Each of the plurality of memory blocks BLK1 to BLKz includes a plurality of memory cells. In an embodiment, the plurality of memory cells are non-volatile memory cells, which may be configured with a vertical channel structure. In some embodiments, the memory cell array 110 may have a two-dimensional structure, and in other embodiments, the memory cell array 110 may have a three-dimensional structure. Each of the plurality of memory cells in the memory cell array 110 may store data of at least one bit. In an embodiment, each of the plurality of memory cells in the memory cell array 110 may be a single-level cell (SLC) that stores data of one bit. In another embodiment, each of the plurality of memory cells in the memory cell array 110 may be a multi-level cell (MLC) that stores data of two bits. In still another embodiment, each of the plurality of memory cells in the memory cell array 110 may be a triple-level cell (TLC) that stores data of three bits. In still another embodiment, each of the plurality of memory cells in the memory cell array 110 may be a quad-level cell (QLC) that stores data of four bits. In some embodiments, the memory cell array 110 may include a plurality of memory cells that each stores data of five or more bits.

The address decoder 120, the page buffer 130, the voltage generator 150, the cache buffer 160, and the input/output interface 170 operate as a peripheral circuit that drives the memory cell array 110. The address decoder 120 is coupled to the memory cell array 110 through the word lines WL. The address decoder 120 operates under the control of the control logic 140. The address decoder 120 receives an address through an input/output buffer (not shown) provided in the semiconductor memory device 100.

The address decoder 120 decodes a block address in the received address. The address decoder 120 selects at least one memory block according to the decoded block address. In a read voltage application operation during a read operation, the address decoder 120 applies a read voltage Vread generated by the voltage generator 150 to a selected word line among the selected memory blocks, and applies a pass voltage Vpass to the other unselected word lines. In a program verify operation, the address decoder 120 applies a verify voltage generated by the voltage generator 150 to the selected word line, and applies the pass voltage Vpass to the other unselected word lines. The address decoder 120 decodes a column address in the received address.

Read and program operations of the semiconductor memory device 100 are performed in units of pages. An address received in a request of the read operation and the program operation includes a block address, a row address, and a column address. The address decoder 120 selects one memory block and one word line according to the block address and the row address. The address decoder 120 may include a block decoder, a row decoder, a column decoder, an address buffer, and the like.

The page buffer 130 is coupled to the memory cell array 110 through the bit lines BL1 to BLm. In order to sense a threshold voltage of memory cells in the read operation and the program verify operation, the page buffer 130 senses a change in amount of current flowing depending on a program state of a corresponding memory cell while continuously supplying a sensing current to bit lines coupled to the memory cells, and latches the sensed change as sensing data. The page buffer 130 operates in response to page buffer control signals output from the control logic 140.

The page buffer 130 temporarily stores read data by sensing data of a memory cell in the read operation. The data temporarily stored in the page buffer 130 may be output to the controller 200 through the cache buffer 160 and the input/output interface 170.

The control logic 140 is coupled to the address decoder 120, the page buffer 130, and the voltage generator 150. Also, the control logic 140 may control operations of the cache buffer 160 and the input/output interface 170.

The control logic 140 receives a command CMD and a control signal CTRL from the controller 200. In FIG. 2, the semiconductor memory device 100 is configured such that the command CMD and the control signal CTRL do not pass through the input/output interface 170 but are transferred to the control logic 140. However, the semiconductor memory device 100 is not limited to that arrangement; the command CMD and the control signal CTRL may be transferred to the control logic 140 through the input/output interface 170. The control logic 140 controls the overall operations of the semiconductor memory device 100 in response to the control signal CTRL. Also, the control logic 140 may control the page buffer 130 and the cache buffer 160 to perform a read operation and a write operation of the memory cell array 110.

In the read operation, the voltage generator 150 generates the read voltage Vread and the pass voltage Vpass in response to a control signal output from the control logic 140. In order to generate a plurality of voltages having various voltage levels, the voltage generator 150 may include a plurality of pumping capacitors for receiving an internal power voltage, and generate a plurality of voltages by selectively activating the plurality of pumping capacitors under the control of the control logic 140.

Figure 3:
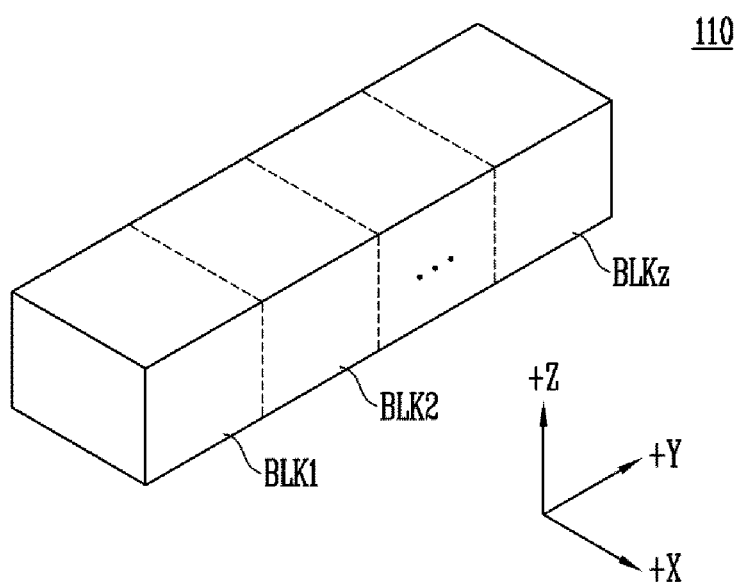
FIG. 3 is a diagram illustrating an exemplary memory cell array of FIG. 2.

FIG. 3 is a diagram illustrating an embodiment of the memory cell array of FIG. 2.

Referring to FIG. 3, the memory cell array 110 includes a plurality of memory blocks BLK1 to BLKz. Each memory block has a three-dimensional structure. Each memory block includes a plurality of memory cells stacked above a substrate. The plurality of memory cells are arranged along +X, +Y, and +Z directions. The structure of each memory block will be described in more detail with reference to FIGS. 4 and 5.

Figure 4:
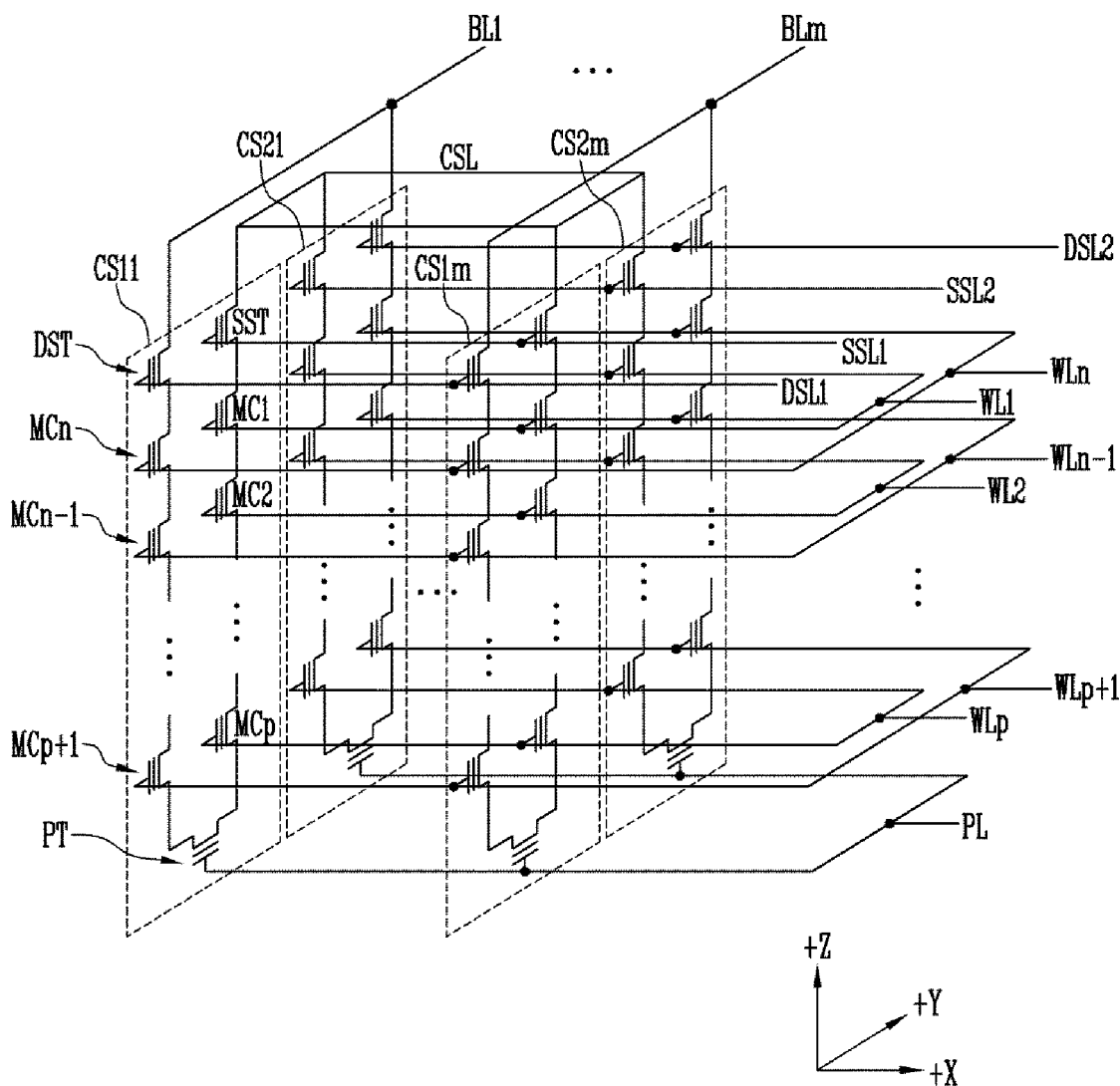
FIG. 4 is a circuit diagram illustrating a configuration of any one memory block among memory blocks of FIG. 3.

FIG. 4 is a circuit diagram illustrating any one memory block BLKa among the memory blocks BLK1 to BLKz of FIG. 3.

Referring to FIG. 4, the memory block BLKa includes a plurality of cell strings CS11 to CS1m and CS21 to CS2m. In an embodiment, each of the plurality of cell strings CS11 to CS1m and CS21 to CS2m may be formed in a 'U' shape. In the memory block BLKa, m cell strings are arranged in a row direction (i.e., a +X direction). In FIG. 4, it is illustrated that two cell strings are arranged in a column direction (i.e., a +Y direction). However, this is for clarity; it will be understood that three or more cell strings may be arranged in the column direction.

Each of the plurality of cell strings CS11 to CS1m and CS21 to CS2m includes at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and memory cells MC1 to MCp.

In an embodiment, the source select transistors of cell strings arranged on the same row are coupled to a source select line extending in the row direction, and the source select transistors of cell strings arranged on different rows are coupled to different source select lines. In FIG. 4, the source select transistors of the cell strings CS11 to CS1m on a first row are coupled to a first source select line SSL1. The source select transistors of the cell strings CS21 to CS2m on a second row are coupled to a second source select line SSL2.

In another embodiment, the source select transistors of the cell strings CS11 to CS1m and CS21 to CS2m may be commonly coupled to one source select line.

The first to nth memory cells MC1 to MCn of each cell string are coupled between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are coupled in series between the source select transistor SST and the pipe transistor PT. The (p+1)th to nth memory cells MCp+1 to MCn are sequentially arranged in the +Z direction, and are coupled in series between the pipe transistor PT and the drain select transistor DST. The first to pth memory cells MC1 to MCp and the (p+1)th to nth memory cells MCp+1 to MCn are coupled through the pipe transistor PT. Gate electrodes of the first to nth memory cells MC1 to MCn of each cell string are coupled to first to nth word lines WL1 to WLn, respectively.

A gate of the pipe transistor PT of each cell string is coupled to a pipe line PL.

The drain select transistor DST of each cell string is coupled between a corresponding bit line and the memory cells MCp+1 to MCn. Cell strings arranged in the row direction are coupled to a drain select line extending in the row direction. The drain select transistors of the cell strings CS11 to CS1m on the first row are coupled to a first drain select line DSL1. The drain select transistors of the cell strings CS21 to CS2m on the second row are coupled to a second drain select line DSL2.

Cell strings arranged in the column direction are coupled to a bit line extending in the column direction. In FIG. 4, the cell strings CS11 and CS21 on a first column are coupled to a first bit line BL1. The cell strings CS1m and CS2m on an mth column are coupled to an mth bit line BLm.

Memory cells coupled to the same word line in the cell strings arranged in the row direction constitute one page. For example, memory cells coupled to the first word line WL1 in the cell strings CS11 to CS1m on the first row constitute one page. Memory cells coupled to the first word line WL1 in the cell strings CS21 to CS2m on the second row constitute another page. When any one of the drain select lines DSL1 and DSL2 is selected, cell strings arranged in one row direction may be selected. When any one of the word lines WL1 to WLn is selected, one page may be selected in the selected cell strings.

In another embodiment, even bit lines and odd bit lines may be provided instead of the first to mth bit lines BL1 to BLm. In addition, even-numbered cell strings among the cell strings CS11 to CS1m or CS21 to CS2m arranged in the row direction may be coupled to the even bit lines, respectively, and odd-numbered cell strings among the cell strings CS11 to CS1m or CS21 to CS2m arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKa is improved. On the other hand, the size of the memory block BLKa increases. When the number of dummy memory cells decreases, the size of the memory block BLKa decreases. On the other hand, the reliability of an operation of the memory block BLKa may be deteriorated.

In order to efficiently control the dummy memory cell(s), each may have a required threshold voltage. Before or after an erase operation of the memory block BLKa, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

Figure 5:
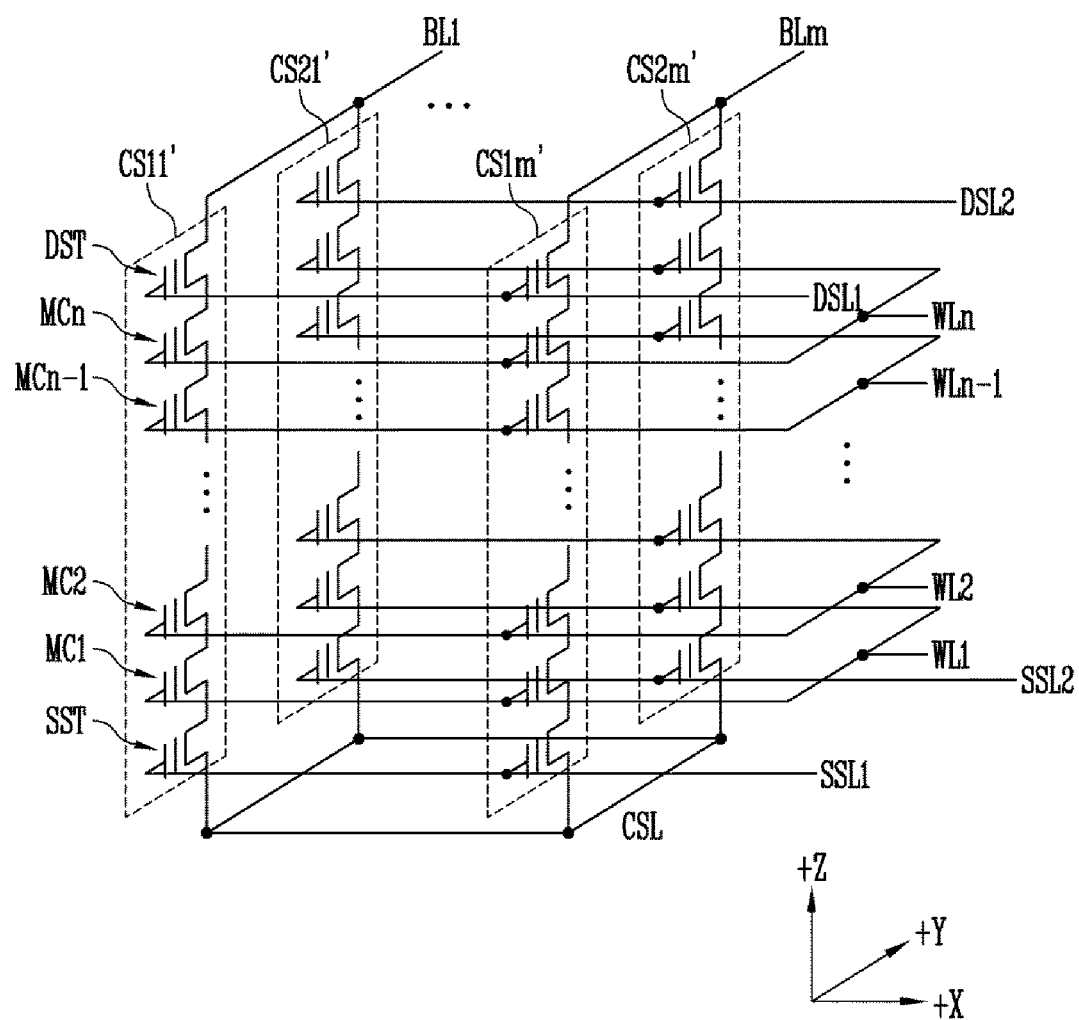
FIG. 5 is a circuit diagram illustrating another configuration of any one memory block among the memory blocks of FIG. 3.

FIG. 5 is a circuit diagram illustrating another embodiment of the one memory block BLKb among the memory blocks BLK1 to BLKz of FIG. 3.

Referring to FIG. 5, the memory block BLKb includes a plurality of cell strings CS11' to CS1m' and CS21' to CS2m'. Each of the plurality of cell strings CS11' to CS1m' and CS21' to CS2m' extends along the +Z direction. Each of the plurality of cell strings CS11' to CS1m' and CS21' to CS2m' includes at least one source select transistor SST, first to nth memory cells MC1 to MCn, and at least one drain select transistor DST, which are stacked on a substrate (not shown) under the memory block BLKb.

The source select transistor SST of each cell string is coupled between a common source line CSL and the memory cells MC1 to MCn. The source select transistors of cell strings arranged on the same row are coupled to the same source select line. The source select transistors of the cell strings CS11' to CS1m' arranged on a first row are coupled to a first source select line SSL1. Source select transistors of the cell strings CS21' to CS2m' arranged on a second row are coupled to a second source select line SSL2. In another embodiment, the source select transistors of the cell strings CS11' to CS1m' and CS21' to CS2m' may be commonly coupled to one source select line.

The first to nth memory cells MC1 to MCn of each cell string are coupled in series between the source select transistor SST and the drain select transistor DST. Gate electrodes of the first to nth memory cells MC1 to MCn are coupled to first to nth word lines WL1 to WLn, respectively.

The drain select transistor DST of each cell string is coupled between a corresponding bit line and the memory cells MC1 to MCn. The drain select transistors of cell strings arranged in the row direction are coupled to a drain select line extending in the row direction. The drain select transistors of the cell strings CS11' to CS1m' on the first row are coupled to a first drain select line DSL1. The drain select transistors of the cell strings CS21' to CS2m' on the second row are coupled to a second drain select line DSL2.

Consequently, the memory block BLKb of FIG. 5 has a circuit identical to that of the memory block BLKa of FIG. 4, except that the pipe transistor PT is excluded from each cell string.

In another embodiment, even bit lines and odd bit lines may be provided instead of the first to mth bit lines BL1 to BLm. In addition, even-numbered cell strings among the cell strings CS11' to CS1m' or CS21' to CS2m' arranged in the row direction may be coupled to the even bit lines, respectively, and odd-numbered cell strings among the cell strings CS11' to CS1m' or CS21' to CS2m' arranged in the row direction may be coupled to the odd bit lines, respectively.

In an embodiment, at least one of the first to nth memory cells MC1 to MCn may be used as a dummy memory cell. For example, the dummy memory cell(s) may be provided to decrease an electric field between the source select transistor SST and the memory cells MC1 to MCp. Alternatively, the dummy memory cell(s) may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb increases. When the number of dummy memory cells decreases, the size of the memory block BLKb decreases. On the other hand, the reliability of an operation of the memory block BLKb may be deteriorated.

In order to efficiently control the dummy memory cell(s), each may have a required threshold voltage. Before or after an erase operation of the memory block BLKb, a program operation may be performed on all or some of the dummy memory cells. When an erase operation is performed after the program operation is performed, the threshold voltage of the dummy memory cells controls a voltage applied to the dummy word lines coupled to the respective dummy memory cells, so that the dummy memory cells can have the required threshold voltage.

Figure 6:
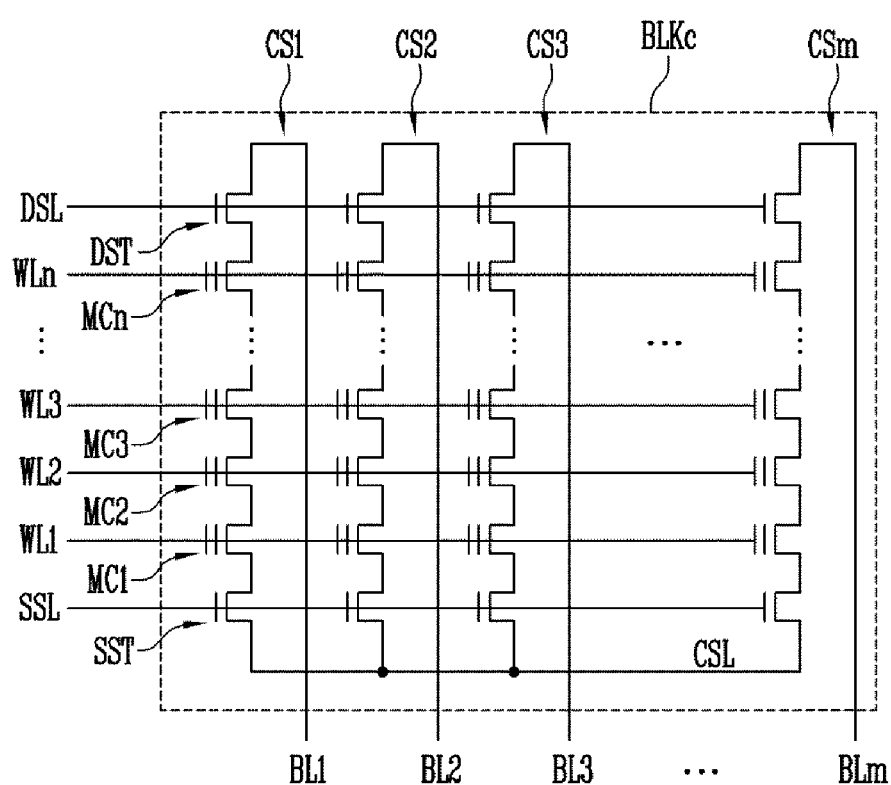
FIG. 6 is a circuit diagram illustrating any one memory block among a plurality of memory blocks in the memory cell array of FIG. 2.

FIG. 6 is a circuit diagram illustrating an embodiment of any one memory block BLKc among the plurality of memory blocks BLK1 to BLKz included in the memory cell array 110 of FIG. 2.

Referring to FIG. 6, the memory block BLKc includes a plurality of strings CS1 to CSm. The plurality of strings CS1 to CSm may be coupled to a plurality of bit lines BL1 to BLm, respectively. Each of the plurality of strings CS1 to CSm includes at least one source select transistor SST, first to nth memory cells MC1 to MCn, and at least one drain select transistor DST.

Each of the select transistors SST and DST and the memory cells MC1 to MCn may have a similar structure. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between a common source line CSL and the memory cells MC1 to MCn.

The first to nth memory cells MC1 to MCn of each cell string is coupled between the source select transistor SST and the drain select transistor DST.

The drain select transistor DST of each cell string is coupled between a corresponding bit line and the memory cells MC1 to MCn.

Memory cells coupled to the same word line constitute one page. As a drain select line DSL is selected, the cell strings CS1 to CSm may be selected. As any one of word lines WL1 to WLn is selected, one page among selected cell strings may be selected.

In another embodiment, even bit lines and odd bit lines may be provided instead of the first to mth bit lines BL1 to BLm. Even-numbered cell strings among the cell strings CS1 to CSm arranged may be coupled to the even bit lines, respectively, and odd-numbered cell strings among the cell strings CS1 to CSm may be coupled to the odd bit lines, respectively.

Figure 7:
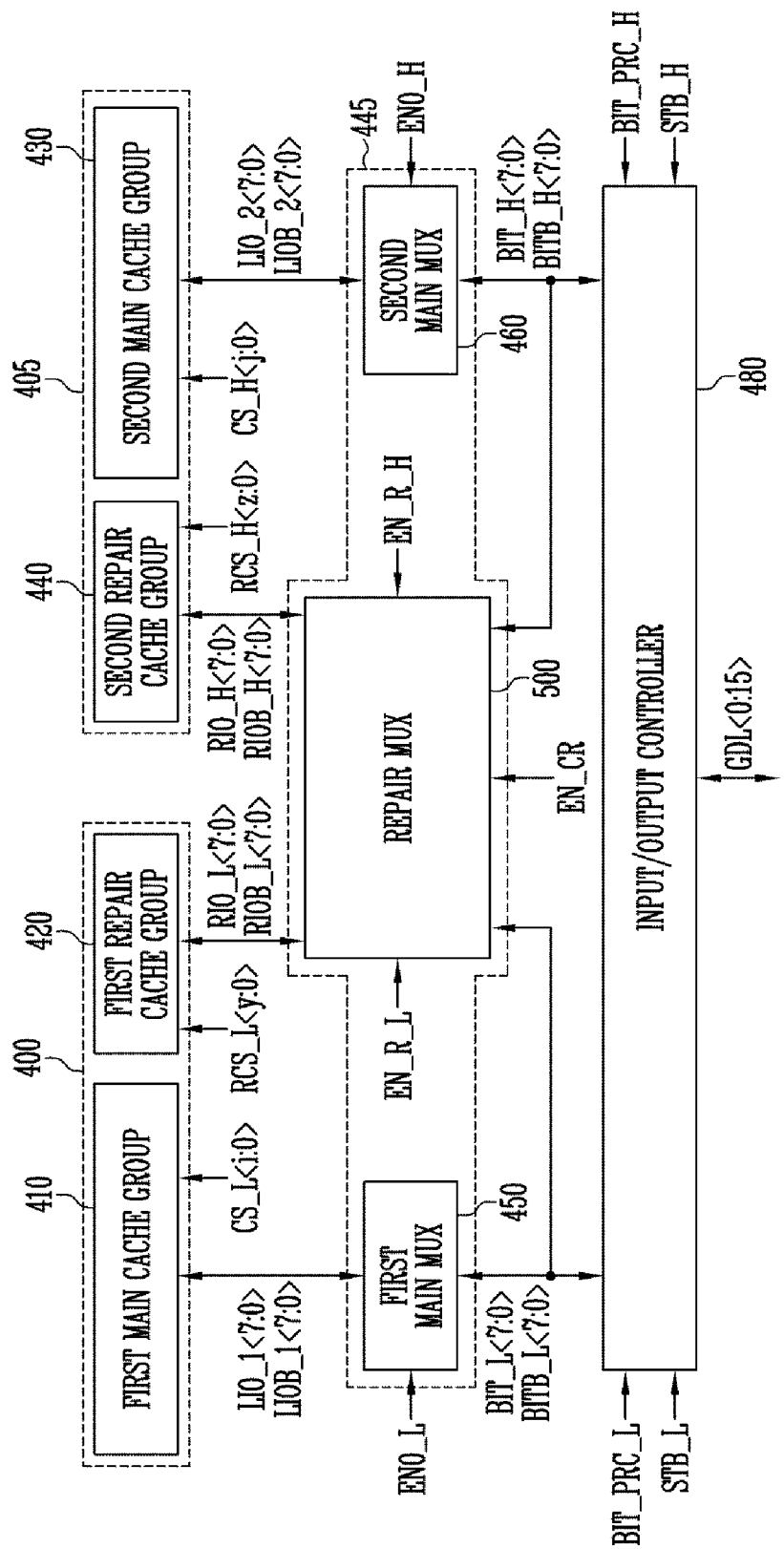
FIG. 7 is a block diagram illustrating a cache buffer of FIG. 2 in accordance with an embodiment of the present disclosure.

FIG. 7 is a block diagram illustrating in more detail an embodiment of the cache buffer 160 of FIG. 2.

Referring to FIG. 7, the cache buffer 160 includes a first cache group 400, a second cache group 405, a selector 445, and an input/output controller 480.

The first cache group 400 may include cache latches corresponding to a first area of the memory cell array. In addition, the second cache group 405 may include cache latches corresponding to a second area of the memory cell array. The first cache group 400 may include a first main cache group 410 and a first repair cache group 420. In addition, the second cache group 405 includes a second main cache group 430 and a second repair cache group 440.

The first main cache group 410 may be configured with a plurality of cache latches for a first main memory area. The first memory area may include at least one main memory block. The first repair cache group 420 may be configured with a plurality of cache latches for a first repair memory area. The first repair memory area may include at least one repair memory block. The second main cache group 430 may be configured with a plurality of cache latches for a second main memory area. The second main memory area may include at least one main memory block. The second repair cache group 440 may be configured with a plurality of cache latches for a second repair memory area. The second repair memory area may include at least one repair memory block.

The first main cache group 410 is coupled to first local input/output (I/O) lines LIO_1<7:0> and first complementary local I/O lines LIOB_1<7:0>. The first main cache group 410 is coupled to first column select lines CS_L<i:0>. The various input/output lines identified below are abbreviated as I/O.

The first repair cache group 420 is coupled to first repair lines RIO_L<7:0> and first complementary repair lines RIOB_L<7:0>. The first repair cache group 420 is coupled to first repair column select lines RCS_L<y:0>.

The second main cache group 430 is coupled to second local I/O lines LIO_2<7:0> and second complementary local I/O lines LIOB_2<7:0>. The second main cache group 430 is coupled to second column select lines CS_H<j:0>.

The second repair cache group 440 is coupled to second repair lines RIO_H<7:0> and second complementary repair lines RIOB_H<7:0>.

The second repair cache group 440 is coupled to a second repair column select line RCS_H<z:0>.

More detailed structures of the first and second main cache groups 410 and 430 and the first and second repair cache groups 420 and 440 will be described later with reference to FIG. 10.

The selector 445 is coupled to the first cache group 400 and the second cache group 405. Through the selector 445, the input/output (I/O) controller 480 may output data to the first cache group 400 and the second cache group 405 or receive data input from the first cache group 400 and the second cache group 405.

The selector 445 performs a select repair operation in the first cache group 400 and/or in the second cache group 405 as a normal repair operation, and performs a select repair operation between the first cache group 400 and the second cache group 405 as a cross repair operation.

The normal repair operation repairs a defect of the first main cache group 410 through the first repair cache group 420 or repairs a defect of the second main cache group 430 through the second repair cache group 440.

The selector 445 includes a first main multiplexer (MUX) 450, a second main MUX 460, and a repair MUX 500. A multiplexer, i.e., MUX performs an operation of selectively coupling local I/O lines and bit I/O lines. Accordingly, in this specification, the first main MUX, the second main MUX, and the repair MUX may be referred to as a first main selector, a second main selector, and a repair selector, respectively.

The first main MUX 450 is coupled between the I/O controller 480 and the first main cache group 410. The first main MUX 450 couples the first local I/O lines LIO_1<7:0> to a first bit I/O line BIT_L<7:0> and couples the first complementary local I/O lines LIOB_1<7:0> to a first complementary bit I/O line BITB_L<7:0>, based on a first enable signal EN0_L.

The second main MUX 460 is coupled between the I/O controller 480 and the second main cache group 430. The second main MUX 460 couples the second local I/O lines LIO_2<7:0> to a second bit I/O line BIT_H<7:0> and couples the second complementary local I/O lines LIOB_2<7:0> to a second complementary bit I/O line BITB_H<7:0>, based on a second enable signal EN0_H.

More detailed pertaining to the structures of the first and second main MUXs 450 and 460 will be described later with reference to FIGS. 8, 9A, and 9B.

The repair MUX 500 is coupled between the first and second repair cache groups 420 and 440 and the I/O controller 480.

When a memory block corresponding to the first main cache group 410 is repaired by the normal repair operation, the repair MUX 500 couples the first repair lines RIO_L<7:0> to the first bit I/O line BIT_L<7:0> and couples the first complementary repair lines RIOB_L<7:0> to the first complementary bit I/O line BITB_L<7:0>, based on a first repair enable signal EN_R_L.

When a memory block corresponding to the second main cache group 430 is repaired through the normal repair operation, the repair MUX 500 couples the second repair lines RIO_H<7:0> to the second bit I/O line BIT_H<7:0> and couples the second complementary repair lines RIOB_H<7:0> to the second complementary bit I/O line BITB_H<7:0>, based on a second repair enable signal EN_R_H.

In a situation in which all repair blocks corresponding to the first repair cache group 420 are exhausted or taken and repair blocks corresponding to the second repair cache group 440 remain, it may be necessary to repair a memory block corresponding to the first main cache group 410. In this case, the memory block corresponding to the first main cache group 410 may be repaired with a memory block corresponding to the second repair group 440. Similarly, a memory block corresponding to the second main cache group 430 may be repaired with a memory block corresponding to the first repair group 420. This repair method may be referred to as a "cross repair operation." In the cache buffer 160 in accordance with an embodiment of the present disclosure, the selector 445 performs the cross repair operation to the first cache group 400 and/or the second cache group 405. This will be described in detail below.

When it is necessary to perform the cross repair operation on a memory block corresponding to the first main cache group 410, the repair MUX 500 couples the second repair lines RIO_H<7:0> to the first bit I/O line BIT_L<7:0> and coupled the second complementary repair lines RIOB_H<7:0> to the first complementary bit I/O line BITB_L<7:0>, based on the first repair enable signal EN_R_L and a cross repair enable signal EN_CR. Similarly, when it is necessary to perform the cross repair operation on a memory block corresponding to the second main cache group 430, the repair MUX 500 couples the first repair lines RIO_L<7:0> to the second bit I/O line BIT_H<7:0> and couples the first complementary repair lines RIOB_L<7:0> to the second complementary bit I/O line BITB_H<7:0>, based on the second repair enable signal EN_R_H and the cross repair enable signal EN_CR.

The I/O controller 480 is coupled to the first bit I/O line BIT_L<7:0>, the first complementary bit I/O line BITB_L<7:0>, the second bit I/O line BIT_H<7:0>, the second complementary bit I/O line BITB_H<7:0>, and a global data line GDL<15:0>. In some embodiments, the global data line GDL<15:0> may be coupled to the I/O interface 170 of FIG. 2. Also, the I/O controller 480 receives a first precharge signal BIT_PRC_L, a first strobe signal STB_L, a second precharge signal BIT_PRC_H, and a second strobe signal STB_H. In a write operation, the I/O controller 480 may transfer data received from the global data line GDL<15:0> to the first and second main cache groups 410 and 430 and the first and second repair cache groups 420 and 440 through the first bit I/O line BIT_L<7:0>, the first complementary bit I/O line BITB_L<7:0>, the second bit I/O line BIT_H<7:0>, and the second complementary bit I/O line BITB_H<7:0>. In a read operation, the I/O controller 480 may transfer data received from the first and second main cache groups 410 and 430 and the first and second repair cache groups 420 and 440 to the global data line GDL<15:0> through the first bit I/O line BIT_L<7:0>, the first complementary bit I/O line BITB_L<7:0>, the second bit I/O line BIT_H<7:0>, and the second complementary bit I/O line BITB_H<7:0>.

As described above, in the cache buffer 160 and the semiconductor memory device having the same in accordance with embodiments of the present disclosure, a repair operation can be flexibly performed through the cross repair.

Figure 8:
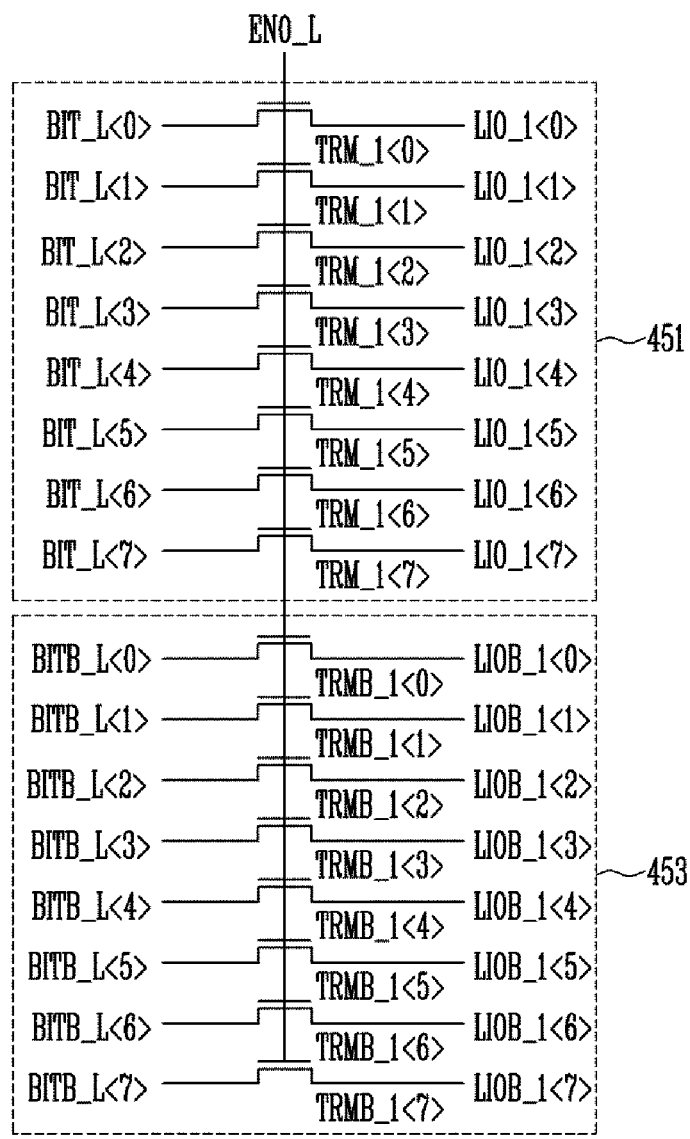
FIG. 8 is a circuit diagram illustrating a first main MUX of FIG. 7 in accordance with an embodiment of the present disclosure.

FIG. 8 is a circuit diagram illustrating in more detail the first main MUX 450 of FIG. 7.

Referring to FIG. 8, the first main MUX 450 includes a first selector 451 and a second selector 453. The first selector 451 includes eight transistors TRM_1<0> to TRM_1<7>, i.e., TRM_<7:0>. The transistors TRM_1<0> to TRM_1<7> respectively couple the first bit I/O lines BIT_L<0> to BIT_L<7>, i.e., BIT_L<7:0> to the first local I/O lines LIO_1<0> to LIO_1<7>, i.e., LIO_1<7:0> according to the first enable signal EN0_L.

The second selector 453 includes eight transistors TRMB_1<0> to TRMB_1<7>, i.e., TRMB_1<7:0>. The transistors TRMB_1<0> to TRMB_1<7> respectively couple the first complementary bit I/O lines BITB_L<0> to BITB_L<7>, i.e., BITB_L<7:0> to the respective first complementary local I/O lines LIOB_1<0> to LIOB_1<7>, i.e., LIOB_1<7:0> according to the first enable signal EN0_L.

Referring to FIGS. 7 and 8 together, it can be seen that the first main MUX 450 couples the first local I/O lines LIO_1<7:0> to the first bit I/O lines BIT_L<7:0> and couples the first complementary local I/O lines LIOB_1<7:0> to the first complementary bit I/O lines BITB_L<7:0> according to the first enable signal EN0_L.

The structure of the second main MUX 460 is substantially identical to that of the first main MUX 450, and therefore, overlapping description is omitted here.

Figure 9A:
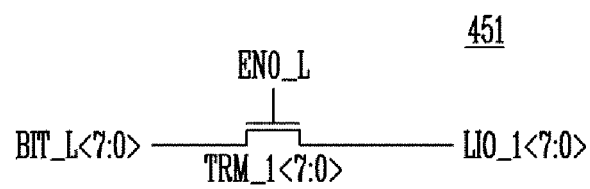
FIGS. 9A and 9B are circuit diagrams illustrating first and second selectors of FIG. 8 in accordance with an embodiment of the present disclosure.
Figure 9B:
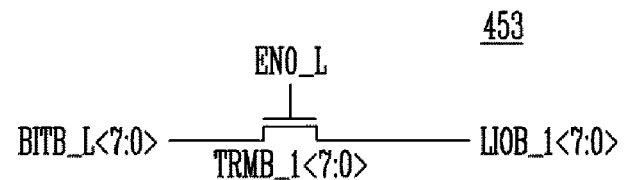

FIGS. 9A and 9B are circuit diagrams more briefly illustrating the first and second selectors 451 and 453 of FIG. 8.

Referring to FIGS. 8 and 9A together, the first selector 451 includes transistors TRM_1<0> to TRM_1<7>, each having the same structure. The transistors TRM_1<0> to TRM_1<7> respectively couple corresponding first local I/O lines LIO_1<7:0> to the first bit I/O lines BIT_L<7:0> according to the first enable signal EN0_L. The eight transistors TRM_1<0> to TRM_1<7> may be collectively identified as transistors TRM_1<7:0>.

Referring to FIGS. 8 and 9B together, the second selector 455 includes transistors TRMB_1<0> to TRMB_1<7> having the same structure. The transistors TRMB_1<0> to TRMB_1<7> respectively couple corresponding first complementary local I/O lines LIOB_1<7:0> to the first complementary bit I/O lines BITB_L<7:0> according to the first enable signal EN0_L. The eight transistors TRMB_1<0> to TRMB_1<7> may be collectively identified as transistors TRMB_1<7:0>.

Figure 10:
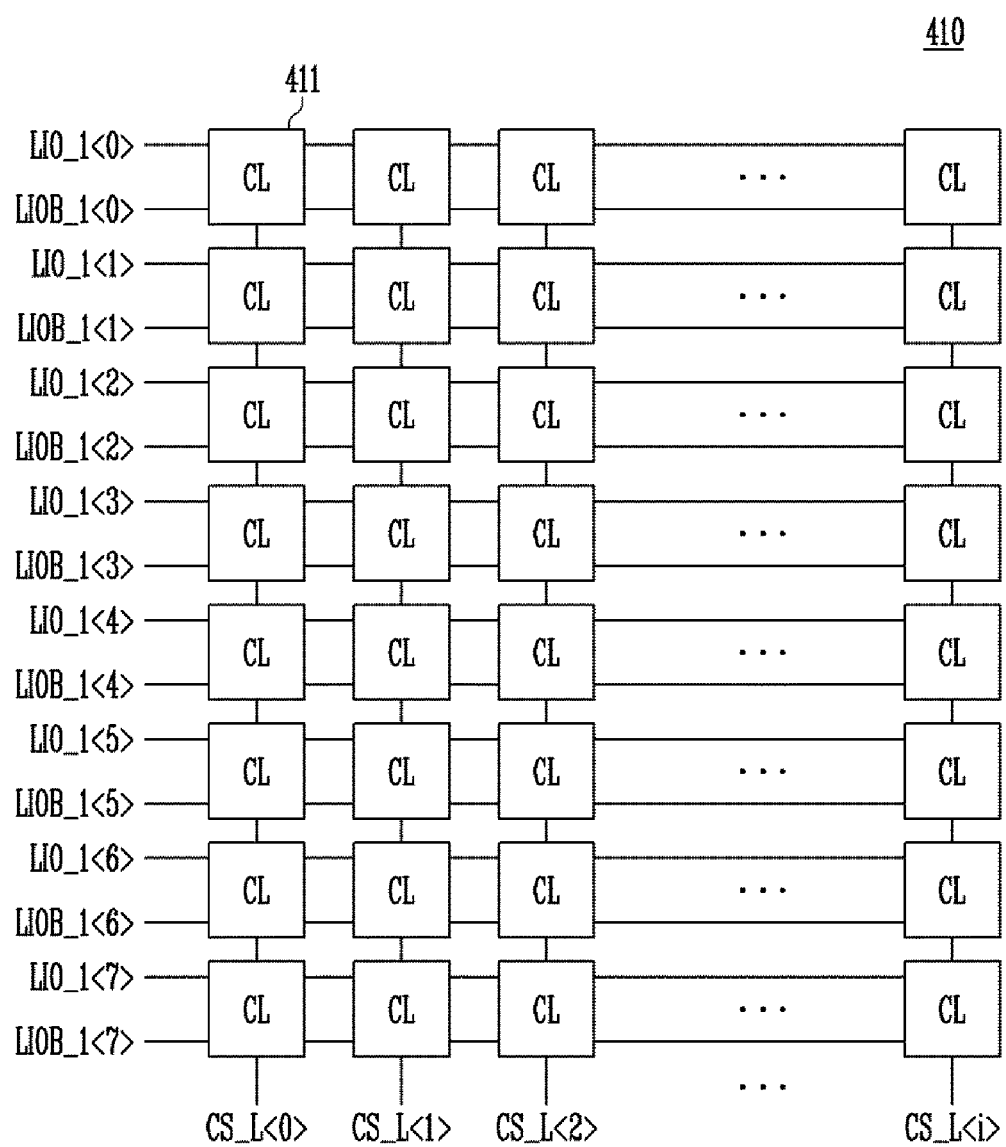
FIG. 10 is a block diagram illustrating a first main cache group of FIG. 7 in accordance with an embodiment of the present disclosure.

FIG. 10 is a block diagram illustrating in more detail the first main cache group 410 of FIG. 7.

Referring to FIG. 10, the first main cache group 410 includes a plurality of cache latches 411. Each of the cache latches 411 may store data of one bit.

Each cache latch 411 is coupled to a corresponding first local I/O line and a corresponding first complementary local I/O line, and is also coupled to a corresponding first column select line.

For example, cache latches located on a first row are coupled to a first local I/O line LIO_1<0> and a first complementary local I/O line LIOB_1<0>. Cache latches located on a second row are coupled to a first local I/O line LIO_1<1> and a first complementary local I/O line LIOB_1<1>.

Cache latches located on a first column are coupled to a first column select line CS_L<0>, and cache latches located on a second column are coupled to a first column select line CS_L<1>.

The semiconductor memory device 100 shown in FIG. 2 may operate in a unit of one byte. Accordingly, the semiconductor memory device 100 performs an I/O operation in a unit of eight bits. Thus, eight cache latches 411 are coupled to one column as shown in FIG. 10.

In order to perform a sequential operation, a signal transferred to first column select lines CS_L<0> to CL_L<i>, i.e., CS_L<i:0> may be sequentially activated according to a column address increased in the first main cache group 410. An operation of transferring bit data stored in the cache latches 411 to the global data line GDL<15:0> through a sensing operation may be controlled by the I/O controller 480.

The first repair cache group 420, the second main cache group 430, and the second repair cache group 440 have the substantially same structure as the first main cache group 410. Therefore, overlapping descriptions will be omitted.

Figure 11:
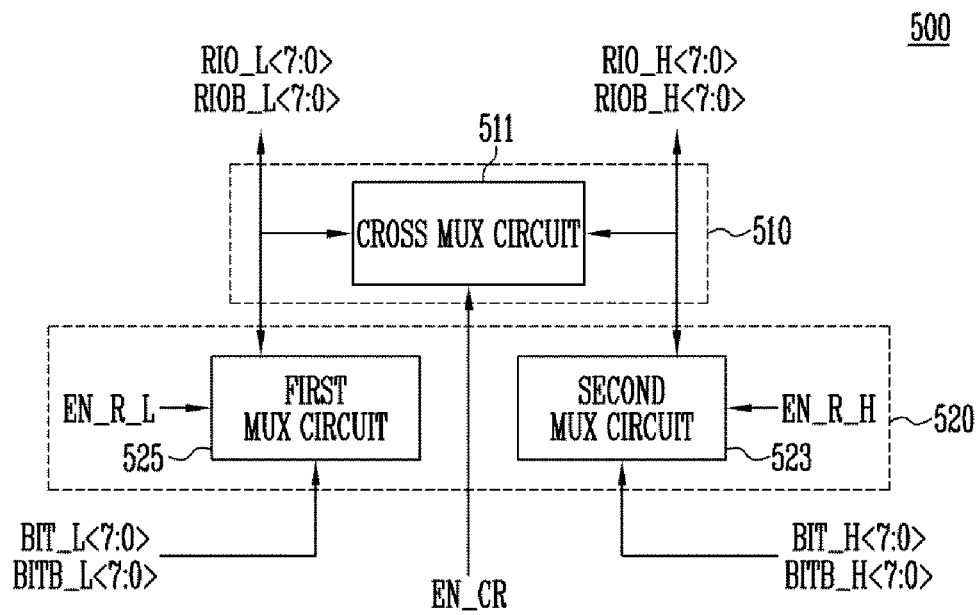
FIG. 11 is a block diagram illustrating a repair MUX of FIG. 7 in accordance with an embodiment of the present disclosure.

FIG. 11 is a block diagram illustrating in more detail the repair MUX of FIG. 7.

Referring to FIG. 11, the repair MUX 500 includes a first MUX circuit 525, a second MUX circuit 523, and a cross MUX circuit 511. In this specification, the first MUX circuit 525, the second MUX circuit 523, and the cross MUX circuit 511 may be referred to as a first select circuit, a second select circuit, and a cross select circuit, respectively.

When a repair operation is not performed, the repair MUX 500 does not operate. The first bit I/O lines BIT_L<7:0> and the first complementary bit I/O lines BITB_L<7:0> are coupled to the first local I/O lines LIO_1<7:0> and the first complementary local I/O lines LIOB_1<7:0> through the first main MUX 450. In addition, the second bit I/O lines BIT_H<7:0> and the second complementary bit I/O lines BITB_H<7:0> are coupled to the second local I/O lines LIO_2<7:0> and the second complementary local I/O lines LIOB_2<7:0> through the second main MUX 460.

In the case of a usual repair operation, i.e., normal repair operation, on a memory block corresponding to the first main cache group, the first MUX circuit 525 operates based on the first repair enable signal EN_R_L. The first bit I/O lines BIT_L<7:0> and the first complementary bit I/O lines BITB_L<7:0> are coupled to the first repair lines RIO_L<7:0> and the first complementary repair lines RIOB_L<7:0>.

In the case of a usual or normal repair operation on a memory block corresponding to the second main cache group, the second MUX circuit 523 operates based on the second repair enable signal EN_R_H. The second bit I/O lines BIT_H<7:0> and the second complementary bit I/O line BITB_H<7:0> are coupled to the second repair lines RIO_H<7:0> and the second complementary repair lines RIOB_H<7:0>.

In a cross repair operation on a memory block corresponding to the first main cache group 410, the first MUX circuit 525 and the cross MUX circuit 511 operate based on the first repair enable signal EN_R_L and the cross repair enable signal EN_CR. The first bit I/O lines BIT_L<7:0> and the first complementary bit I/O lines BITB_L<7:0> are coupled to the second repair lines RIO_H<7:0> and the second complementary repair lines RIOB_H<7:0>.

In the case of a cross repair operation on a memory block corresponding to the second main cache group 430, the second MUX circuit 523 and the cross MUX circuit 511 operate based on the second repair enable signal EN_R_H and the cross repair enable signal EN_CR. The second bit I/O lines BIT_H<7:0> and the second complementary bit I/O lines BITB_H<7:0> are coupled to the first repair lines RIO_L<7:0> and the first complementary repair lines RIOB_L<7:0>.

Referring to FIG. 11, it can be seen that the repair MUX 500 includes a configuration of MUXs of two stages. A first stage 520 includes the first MUX circuit 525 and the second MUX circuit 523. A second stage 510 includes the cross MUX circuit 511. Since the cross MUX 511 does not operate in the case of a normal repair operation, a data signal passes through only the MUX of the first stage 520. In the case of a cross repair operation, the cross MUX circuit 511 also operates in addition to the first MUX circuit 525 and the second MUX circuit 523. Thus, a data signal passes through both the MUXs of the first stage 520 and the second stage 510.

Figure 12A:
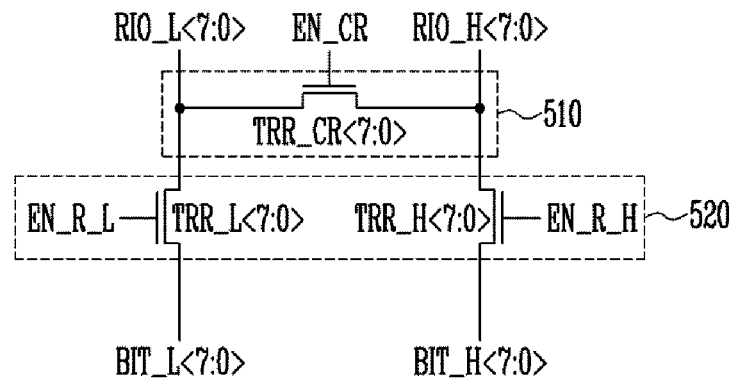
FIGS. 12A and 12B are circuit diagrams illustrating the repair MUX shown in FIG. 11 in accordance with an embodiment of the present disclosure.
Figure 12B:
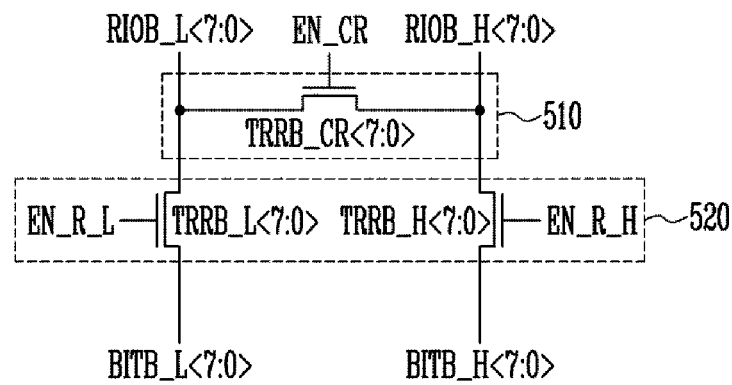

FIGS. 12A and 12B are circuit diagrams illustrating in more detail the repair MUX 500 shown in FIG. 11.

Referring to FIG. 12A, a circuit is illustrated, which couples the first bit I/O lines BIT_L<7:0>, the second bit I/O lines BIT_H<7:0>, the first repair lines RIO_L<7:0>, and the second repair lines RIO_H<7:0> in the repair MUX 500 of FIG. 11. Referring to FIG. 12B, a circuit is illustrated, which couples the first complementary bit I/O lines BITB_L<7:0>, the second complementary bit I/O lines BITB_H<7:0>, the first complementary repair lines RIOB_L<7:0>, and the second complementary repair lines RIOB_H<7:0> in the repair MUX 500 of FIG. 11.

A transistor TRR_L<7:0> of FIG. 12A and a transistor TRRB_L<7:0> of FIG. 12B are included in the first MUX circuit 525. A transistor TRR_H<7:0> of FIG. 12A and a transistor TRRB_H<7:0> of FIG. 12B are included in the second MUX circuit 523. A transistor TRR_CR<7:0> of FIG. 12A and a transistor TRRB_CR<7:0> of FIG. 12B are included in the cross MUX circuit 511.

Operations of the first main MUX 450, the repair MUX 500, and the second main MUX 460 will be described in more detail with reference to FIGS. 13 to 15.

FIG. 13 is a timing diagram illustrating a data output operation of the cache buffer 160 of FIG. 7 when repair is not performed. FIG. 13 illustrates a timing diagram, based on an operation of the first main MUX 450 coupled to the first main cache group 410 when the repair is not performed.

Referring to FIG. 13, when the repair is not performed, the first enable signal EN0_L applied to the first main MUX 450 maintains a logic-high state, and the first repair enable signal EN_R_L maintains a logic-low state. Although not shown in FIG. 13, the cross repair signal EN_CR may maintain the logic-low state.

In order to achieve sequential data output, the first precharge signal BIT_PRC_L periodically repeats between an enabled state and a disabled state. To this end, 'i' number of first column select lines CS_L<i:0> are sequentially activated corresponding to i pulses of the first precharge signal BIT_PRC_L. That is, in the timing diagram of FIG. 13, at a time t1, a signal of a first column select line CS_L<0> corresponding to the first column among the first column select lines CS_L<i:0> is activated, and signals of the other first column select lines are deactivated. In addition, at a time t4, a signal of a first column select line CS_L<1> corresponding to the second column is activated, and signals of the other first column select lines are deactivated. This procedure is repeated until a signal of a first column select line CS_L<i> corresponding to an ith column is activated.

At the time t1, when the signal of the first column select signal CS_L<0> is activated, data of the cache latches located on the first column are sensed. Accordingly, a voltage difference between the first local I/O lines LIO_1<7:0> and the corresponding first complementary local I/O lines LIOB_1<7:0> may occur. That is, the voltage difference between the first local I/O lines LIO_1<7:0> and the corresponding first complementary local I/O lines LIOB_1<7:0> may occur or may not occur according to data stored in a cache latch.

Since the first main MUX 450 is under operation, voltages of the first local I/O lines LIO_1<7:0> and the corresponding first complementary local I/O lines LIOB_1<7:0> are transferred to the first bit I/O lines BIT_L<7:0> and the first complementary bit I/O lines BITB_L<7:0>.

After a sufficient voltage difference occurs, at a time t2, the first strobe signal STB_L applied to the I/O controller 480 is activated or enabled to sense data. The sensed data is transferred to the global data lines GDL<7:0>.

At a time t3, the signal of the first column select signal CS_L<0> is activated, and accordingly, the voltage difference between the first bit I/O lines BIT_L<7:0> and the first complementary bit I/O lines BITB_L<7:0> decreases. Since the first main MUX 450 is under operation, the voltage difference between the first local I/O lines LIO_1<7:0> and the corresponding first complementary local I/O lines LIOB_1<7:0> also decreases. Through this procedure, an operation of sensing data of a cache latch located on the first column, and sensing data of a cache latch located on the second column by entering into a second period at the time t4 is performed.

FIG. 14 is a timing diagram illustrating a method of performing a usual or normal repair operation on a memory block in the first main cache group 410. Although not shown in FIG. 14, the cross repair signal EN_CR maintains the logic-low state.

First, in the case of the first column, a general data sensing operation is performed without repair. That is, at a time t5, the signal of the first column select signal CS_L<0> is enabled to sense data stored in a cache latch of the first column. At a time t6, data of the first column of the first main cache group 410 is sensed when the first strobe signal STB_L is enabled.

Subsequently, at a time t7, the first repair enable signal EN_R_L is enabled, and the first enable signal EN0_L is deactivated or disabled. Accordingly, the first MUX circuit 525 of the repair MUX 500 operates, and the first main MUX 450 does not operate. The first bit I/O line BIT_L<7:0> is coupled to the first repair lines RIO_L<7:0>, and the first complementary bit I/O line BITB_L<7:0> is coupled to the first complementary repair lines RIOB_L<7:0>.

Since the first MUX circuit 525 is deactivated at the time t7, the voltage difference between the first local I/O line LIO_1<0> and the first complementary local I/O line LIOB_1<0> is maintained.

Subsequently, at a time t8, a signal of a first repair column select line RCS_L<0> corresponding to the first column among the first repair column select lines RCS_L<y:0> is enabled. Accordingly, a voltage difference between the first repair lines RIO_L<7:0> and the first complementary repair lines RIOB_L<7:0> occurs according to data stored in the cache latches located on the first column of the first repair cache group 420. The voltage difference between the first repair lines RIO_L<7:0> and the first complementary repair lines RIOB_L<7:0> becomes the voltage difference between the first bit I/O line BIT_L<7:0> and the first complementary bit I/O line BITB_L<7:0>.

Subsequently, when the first strobe signal STB_L is enabled, the result obtained by sensing the voltage difference between the first bit I/O line BIT_L<7:0> and the first complementary bit I/O line BITB_L<7:0> is transferred to the global data line GDL<7:0> as output data.

That is, in a second period of data sensing, data of the cache latches located on the first column of the first repair cache group 420 are output. Subsequently, at a time t9, the first repair enable signal EN_R_L is disabled, and the first enable signal EN0_L is enabled. Thus, the same operation as the timing diagram of FIG. 13 is performed after the time t9. That is, data of the first repair cache group 420 is not output, but data of the first main cache group 410 is output.

FIG. 15 is a timing diagram illustrating a cross repair operation. FIG. 15 illustrates an operation in which a memory block corresponding to the first main cache group 410 is cross-repaired with a memory block corresponding to the second repair cache group 440.

First, as shown in FIGS. 13 and 14, it can be seen that, at times t10 to t12, data of the cache latch located on the first column of the first main cache group 410 is output to the global data line GDL<7:0>.

At a time t12, the cross repair signal EN_CR is enabled, the first repair enable signal EN_R_L is enabled, and the first enable signal EN0_L is disabled.

Accordingly, the first MUX circuit 525 and the cross MUX circuit 511 of FIG. 11 operate. The first bit I/O line BIT_1<7:0> is coupled to the second repair lines RIO_H<7:0>, and the first complementary bit I/O line BITB_L<7:0> is coupled to the second complementary repair lines RIOB_H<7:0>.

Since the first MUX circuit 525 is deactivated at the time t12, the voltage difference between the first I/O line LIO_1<0> and the first complementary local I/O line LIOB_1<0> is maintained.

Subsequently, at a time t13, a signal of a second repair column select line RCS_H<0> corresponding to the first column among the second repair column select lines RCS_H<z:0> is enabled. Accordingly, a voltage difference between the second repair lines RIO_H<7:0> and the second complementary repair lines RIOB_H<7:0> occurs according to data stored in cache latches located on the first column of the second repair cache group 440. The voltage difference between the second repair lines RIO_H<7:0> and the second complementary repair lines RIOB_H<7:0> becomes the voltage difference between the first bit I/O line BIT_L<7:0> and the first complementary bit I/O line BITB_L<7:0>.

Subsequently, when the first strobe signal STB_L is enabled, the result obtained by sensing the voltage difference between the first bit I/O line BIT_L<7:0> and the first complementary bit I/O line BITB_L<7:0> is transferred to the global data line GDL<7:0> as output data.

That is, in a second period of data sensing, data of the cache latches located on the first column of the second repair cache group 440 are output. Subsequently, at a time t14, the cross repair signal EN_CR is disabled, the first repair enable signal EN0_L is enabled, and the first enable signal EN0_L is enabled. Thus, the same operation as the timing diagram of FIG. 14 or 13 is performed after the time t14. That is, data of the second repair cache group 440 is not output, but data of the first main cache group 410 is output.

Figure 16:
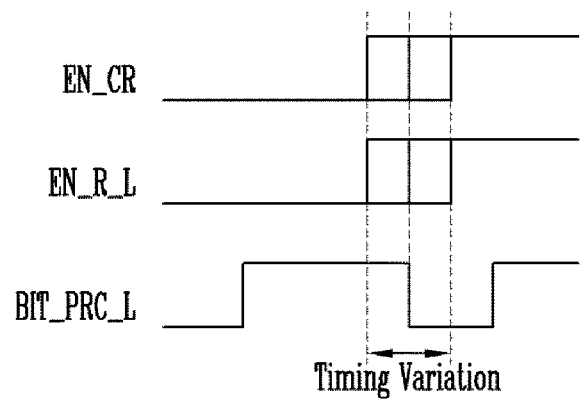
FIG. 16 is a timing diagram illustrating a problem of the cross repair operation.

FIG. 16 is a timing diagram illustrating a problem of the cross repair operation.

In FIG. 16, the cross repair signal EN_CR, the first repair enable signal EN_R_L, and the precharge signal BIT_PRC_L are illustrated in the vicinity of the time t12 of FIG. 15.

Referring to FIGS. 11 and 16 together, in order to perform the cross repair operation, the first repair enable signal EN_R_L is applied to the first MUX circuit 525, and the cross repair signal EN_CR is applied to the cross MUX circuit 511. As shown in FIG. 11, the operation timing of the first MUX circuit 525 of the first stage 520 and the cross MUX circuit 511 in the cross repair operation is to be accurately controlled. However, when the cross repair signal EN_CR and the first repair enable signal EN_R_L are applied to the cross MUX circuit 511 and the first MUX circuit 525, which are configured in two stages, it is difficult to reduce a time variation, which occurs as shown in FIG. 16. This makes it difficult to accurately transfer data at high speed during a cross repair operation.

In order to solve this problem, in some embodiments, the MUX circuits included in the repair MUX 500 of the cache buffer 160 are configured in one stage. Accordingly, in the cross repair operation, the repair MUX 500 performs a repair MUX operation between the first main cache group 410 and the second repair cache group 440 based on a single control signal. Thus, the timing variation of the control signal is reduced in the cross repair operation, and reliability is improved in a high-speed operation of the cache buffer 160.

Figure 17:
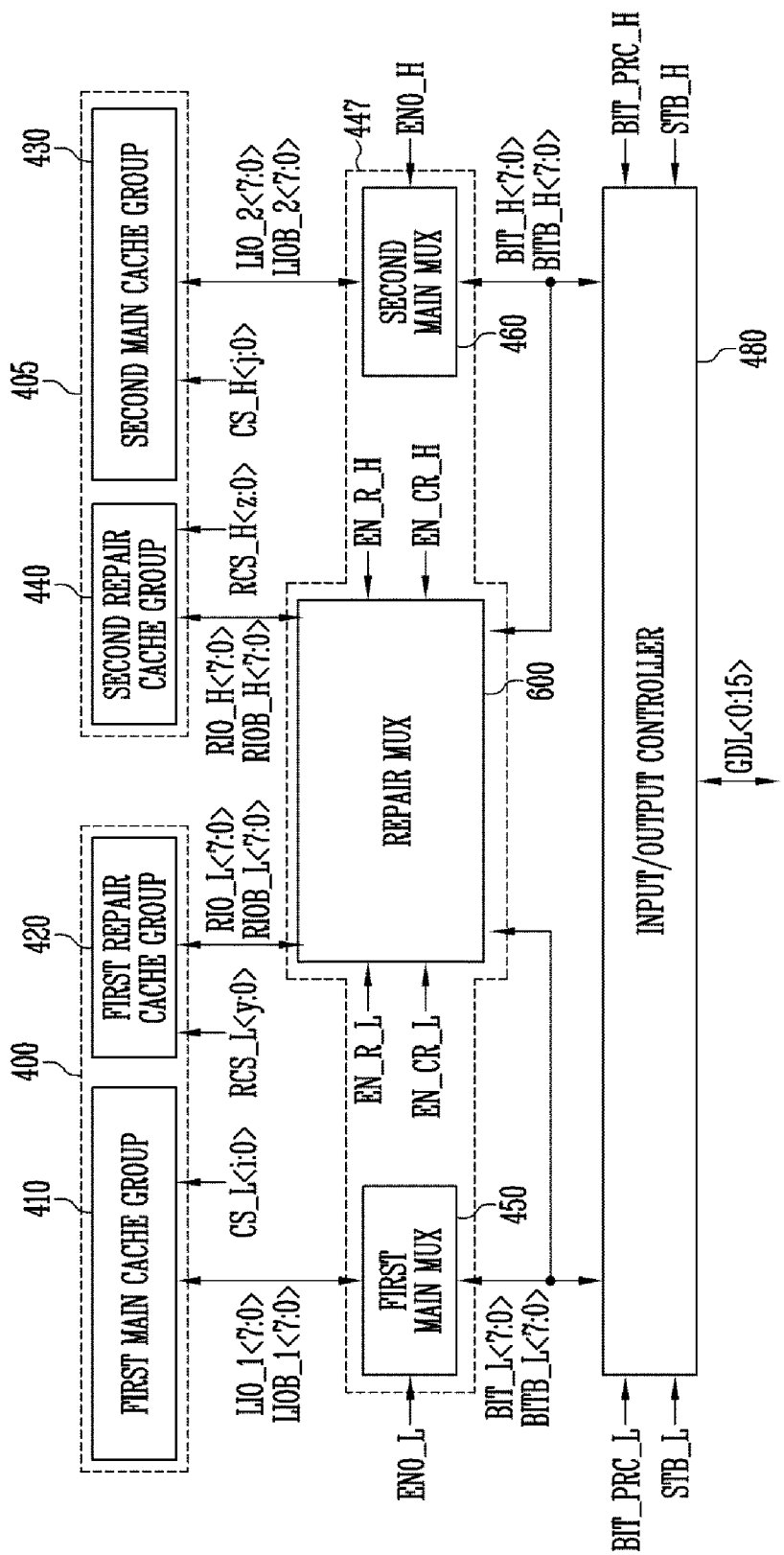
FIG. 17 is a block diagram illustrating the cache buffer of FIG. 2 in accordance with an embodiment of the present disclosure.

FIG. 17 is a block diagram illustrating in more detail another embodiment of the cache buffer 160 of FIG. 2.

Referring to FIG. 17, the cache buffer 160 includes the first cache group 400, the second cache group 405, a selector 447, and the I/O controller 480. Other components except the selector 447 are identical to those of the cache buffer 160 shown in FIG. 7, and therefore, overlapping descriptions will be omitted.

The selector 447 shown in FIG. 17 is coupled to the first cache group 400 and the second cache group 405. Through the selector 447, the I/O controller 480 may output data to the first cache group 400 and the second cache group 405, or receive data input from the first cache group 400 and the second cache group 405.

The selector 447 performs a select repair operation in the first cache group 400 and/or in the second cache group 405 as a normal repair operation, and performs a select repair operation between the first cache group 400 and the second cache group 405 as a cross repair operation.

The selector 447 includes the first main MUX 450, the second main MUX 460, and a repair MUX 600. The configuration of the first main MUX 450 and the second main MUX 460 is the same as shown in FIG. 7.

The repair MUX 600 is coupled between first and second repair cache group 420 and 440 and the I/O controller 480.

When a memory block corresponding to a first main cache group 410 is repaired by the normal repair operation, the repair MUX 600 couples first repair lines RIO_L<7:0> to a first bit I/O line BIT_L<7:0> and couples first complementary repair lines RIOB_L<7:0> to a first complementary bit I/O line BITB_L<7:0>, based on a first repair enable signal EN_R_L.

When a memory block corresponding to a second main cache group 430 is repaired by the normal repair operation, the repair MUX 600 couples second repair lines RIO_H<7:0> to a second bit I/O line BIT_H<7:0> and couples second complementary repair lines RIOB_H<7:0> to a second complementary bit I/O line BiTB_H<7:0>, based on a second repair enable signal EN_R_H. This is the substantially same as the repair MUX 500 shown in FIG. 7.

When the cross repair operation is necessary for a memory block corresponding to the second main cache group 430, the repair MUX 600 couples the first repair lines RIO_L<7:0> to the second bit I/O line BIT_H<7:0> and couples the first complementary repair lines RIOB_L<7:0> to the second complementary bit I/O line BITB_H<7:0>, based on a first cross repair enable signal EN_CR_L.

When the cross repair operation is necessary for a memory block corresponding to the first main cache group 410, the repair MUX 600 couples the second repair lines RIO_H<7:0> to the first bit I/O line BIT_L<7:0> and couples the second complementary repair lines RIOB_H<7:0> to the first complementary bit I/O line BITB_L<7:0>, based on a second cross repair enable signal EN_CR_H.

A more detailed configuration of the repair MUX 600 of FIG. 17 will be described with reference to FIGS. 18 to 19D.

Figure 18:
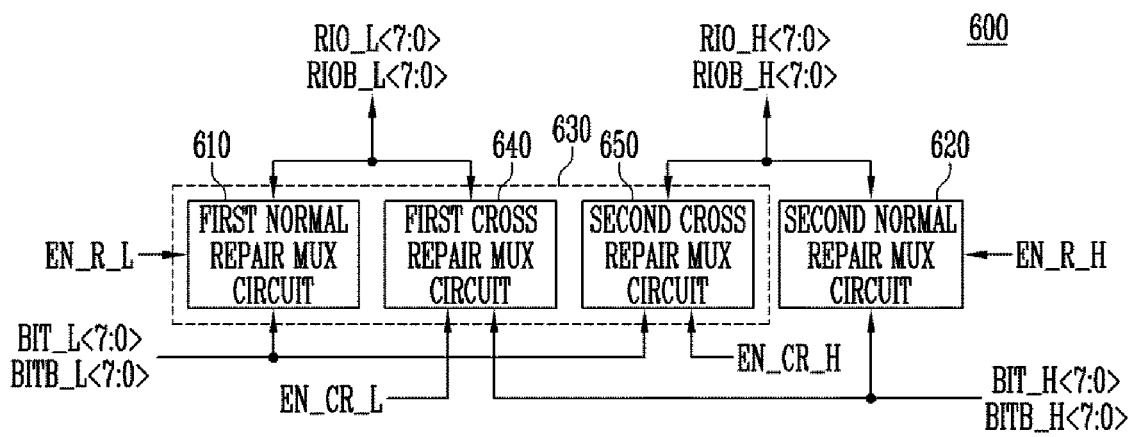
FIG. 18 is a block diagram illustrating a repair MUX of FIG. 17 in accordance with an embodiment of the present disclosure.

FIG. 18 is a block diagram illustrating in more detail the repair MUX 600 of FIG. 17.

Referring to FIG. 18, the repair MUX 600 includes a first normal repair MUX circuit 610, a second normal repair MUX circuit 620, a first cross repair MUX circuit 640, and a second cross repair MUX circuit 650. In this embodiment, the first normal repair MUX circuit 610, the second normal repair MUX circuit 620, the first cross repair MUX circuit 640, and the second cross repair MUX circuit 650 may be referred to as a first normal repair select circuit, a second normal repair select circuit, a first cross repair select circuit, and a second cross repair select circuit, respectively. The first normal repair MUX circuit 610 and the second normal repair MUX circuit 620 may be configured substantially identically to the first MUX circuit 525 and the second MUX circuit 523 of FIG. 11, respectively.

The first cross repair MUX circuit 640 couples the first repair lines RIO_L<7:0> and the first complementary repair lines RIOB_L<7:0> respectively to the second bit I/O lines BIT_H<7:0> and the second complementary bit I/O lines BITB_H<7:0>, based on the first cross repair enable signal EN_CR_1.

The second cross repair MUX circuit 650 couples the second repair lines RIO_H<7:0> and the second complementary repair lines RIOB_H<7:0> respectively to the first bit I/O lines BIT_L<7:0> and the first complementary bit I/O lines BITB_L<7:0>, based on the second cross-repair enable signal EN_CR_H.

While the first normal repair MUX circuit 610 or the second normal repair MUX circuit 620 is operating, the first cross repair MUX circuit 640 or the second cross repair MUX circuit 650 does not operate. While the first cross repair MUX circuit 640 or the second cross repair MUX circuit 650 is operating, the first normal repair MUX circuit 610 or the second normal repair MUX circuit 620 does not operate.

Detailed configurations of the first and second normal repair MUX circuits 610 and 620 and the first and second cross repair MUX circuits 640 and 650 will be described later with reference to FIGS. 19A to 19D.

Figure 19A:
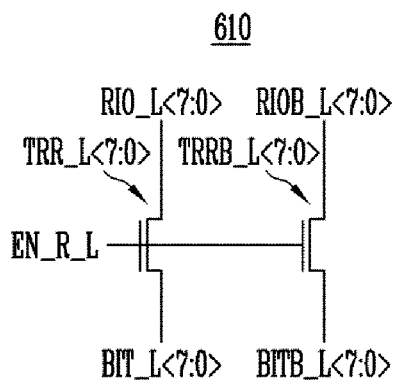
FIGS. 19A and 19B are circuit diagrams illustrating configurations of first and second normal repair MUX circuits in accordance with an embodiment of the present disclosure.
Figure 19B:
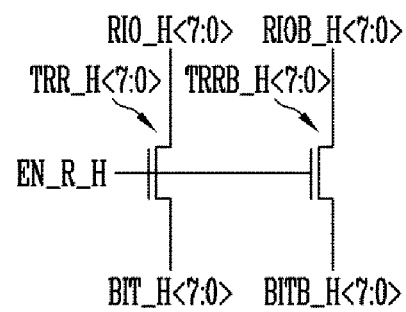
Figure 19C:
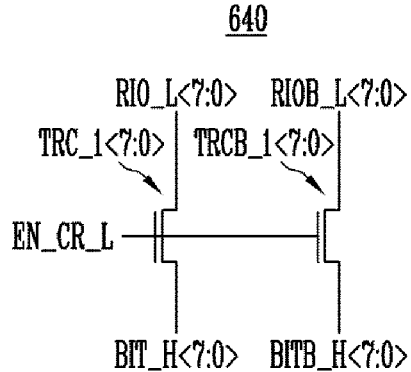
FIGS. 19C and 19D are circuit diagrams illustrating configurations of first and second cross repair MUX circuits in accordance with an embodiment of the present disclosure.

FIGS. 19A and 19B are circuit diagrams illustrating configurations of the first and second normal repair MUX circuits 610 and 620. FIGS. 19C and 19D are circuit diagrams illustrating configurations of the first and second cross repair MUX circuits 640 and 650.

Referring to FIG. 19A, the first normal repair MUX circuit 610 includes a plurality of transistors that respectively couple the first repair lines RIO_L<7:0> and the first complementary repair lines RIOB_L<7:0> to the first bit I/O lines BIT_L<7:0> and the first complementary bit I/O lines BITB_L<7:0>, based on the first repair enable signal EN_R_L. Although briefly shown in FIG. 19A, it can be seen that the first normal repair MUX circuit 610 includes eight transistors TRR_L<7:0> for respectively coupling the first repair lines RIO_L<7:0> to the first bit I/O lines BIT_L<7:0> and eight transistors TRRB_L<7:0> for respectively coupling the first complementary repair lines RIOB_L<7:0> to the first complementary bit I/O lines BITB_L<7:0>. That is, in an exemplary embodiment, the first normal repair MUX circuit 610 may include 16 transistors.

Referring to FIG. 19B, the second normal repair MUX circuit 620 includes a plurality of transistors for respectively coupling the second repair lines RIO_H<7:0> and the second complementary repair lines RIOB_H<7:0> to the second bit I/O lines BIT_H<7:0> and the second complementary bit I/O lines BITB_H<7:0>, based on the second repair enable signal EN_R_H. Similar to the first normal repair MUX circuit 610 shown in FIG. 19A, the second normal repair MUX circuit 620 may also include 16 transistors TRR_H<7:0> and TRRB_H<7:0>.

Referring to FIG. 19C, the first cross repair MUX circuit 640 includes a plurality of transistors that respectively couple the first repair lines RIO_L<7:0> and the first complementary repair lines RIOB_L<7:0> to the second bit I/O lines BIT_H<7:0> and the second complementary bit I/O lines BITB_H<7:0>, based on the first cross repair enable signal EN_CR_L. Similar to each of the MUX circuits shown in FIGS. 19A and 19B, the first cross repair MUX circuit 640 may also include 16 transistors TRC_1<7:0> and TRCB_1<7:0>.

Figure 19D:
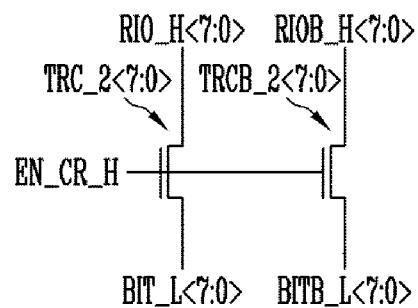

Referring to FIG. 19D, the second cross repair MUX circuit 650 includes a plurality of transistors that respectively couple the second repair lines RIO_H<7:0> and the second complementary repair lines RIOB_H<7:0> to the first bit I/O lines BIT_L<7:0> and the first complementary bit I/O lines BITB_L<7:0>, based on the second cross repair enable signal EN_CR_H. Similar to each of the MUX circuits shown in FIGS. 19A to 19C, the second cross repair MUX circuit 650 may also include 16 transistors TRC_2<7:0> and TRCB_2<7:0>.

Figure 20A:
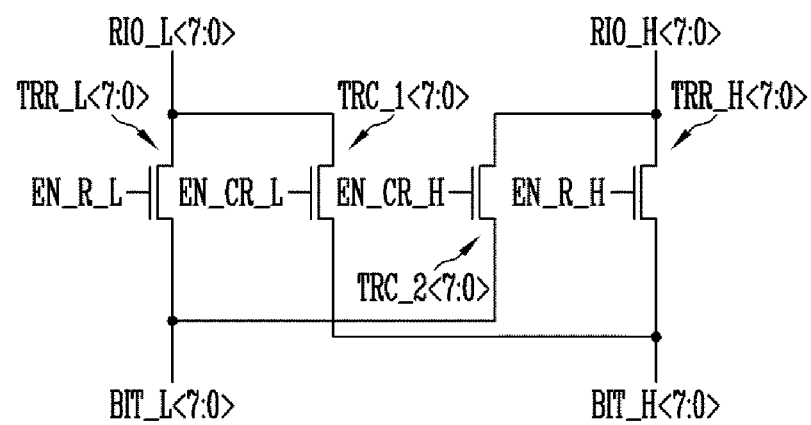
FIGS. 20A and 20B are circuit diagrams illustrating the repair MUX shown in FIG. 18 in accordance with an embodiment of the present disclosure.
Figure 20B:
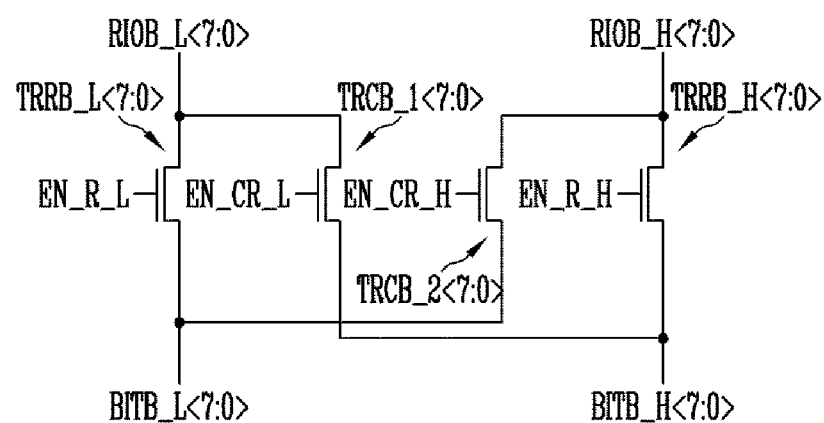

FIGS. 20A and 20B are circuit diagrams illustrating in more detail the repair MUX 600 shown in FIG. 18.

Referring to FIG. 20A, a circuit is illustrated, which couples the first bit I/O lines BIT_L<7:0>, the second bit I/O lines BIT_H<7:0>, the first repair lines RIO_L<7:0>, and the second repair lines RIO_H<7:0> in the repair MUX 600 of FIG. 18. Referring to FIG. 20B, a circuit is illustrated, which couples the first complementary bit I/O lines BITB_L<7:0>, the second complementary bit I/O lines BITB_H<7:0>, the first complementary repair lines RIOB_L<7:0>, and the second complementary repair lines RIOB_H<7:0> in the repair MUX 600 of FIG. 18.

A transistor TTR_L<7:0> of FIG. 20A and a transistor TRRB_L<7:0> of FIG. 20B are included in the first normal repair MUX circuit 610. A transistor TRR_H<7:0> of FIG. 20A and a transistor TRRB_H<7:0> of FIG. 20B are included in the second normal repair MUX circuit 620. A transistor TRC_1<7:0> of FIG. 20A and a transistor TRCB_1<7:0> of FIG. 20B are included in the first cross repair MUX circuit 640. A transistor TRC_2<7:0> of FIG. 20A and a transistor TRCB_2<7:0> of FIG. 20B are included in the second cross repair MUX circuit 650. That is, it can be seen that circuits of FIGS. 20A and 20B are identical to those of FIGS. 19A to 19D.

FIG. 21 is a timing diagram illustrating a cross repair operation of the cache buffer 160 shown in FIG. 17.

FIG. 21 illustrates an operation in which a memory block corresponding to the first main cache group 410 is cross-repaired with a memory block corresponding to the second repair cache group 440. Since the cross repair operation is performed, the first and second repair enable signals EN_R_L and EN_R_H maintain the logic-low state. In addition, the first cross repair signal EN_CR_L also maintains the logic-low state.

First, as shown in FIG. 15, it can be seen that, at times t15 to t17, data of a cache latch located on the first column of the first main cache group 410 is output to the global data line GDL<7:0>.

At the time t17, the second cross repair signal EN_CR_H is enabled, and the first enable signal EN0_1 is disabled.

Accordingly, the second cross MUX circuit 650 of FIG. 18 operates. The first bit I/O line BIT_L<7:0> is coupled to the second repair lines RIO_H<7:0>, and the first complementary bit I/O line BITB_L<7:0> is coupled to the second complementary repair lines RIOB_H<7:0>.

Since the first cross MUX circuit 640 is disabled at the time t17, a voltage difference between the first local I/O line LIO_1<0> and the first complementary local I/O line LIOB_1<0> is maintained.

Subsequently, at a time t19, a signal of a second repair column select line RCS_H<0> corresponding to the first column among the second repair column select lines RCS_H<z:0> is enabled. Accordingly, a voltage difference between the second repair lines RIO_H<7:0> and the second complementary repair lines RIOB_H<7:0> occurs according to data stored in cache latches located on the first column of the second repair cache group 440. The voltage difference between the second repair lines RIO_H<7:0> and the second complementary repair lines RIOB_H<7:0> becomes the voltage difference between the first bit I/O line BIT_L<7:0> and the first complementary bit I/O line BITB_L<7:0>.

Subsequently, when the first strobe signal STB_L is enabled, the result obtained by sensing the voltage difference between the first bit I/O line BIT_L<7:0> and the first complementary bit I/O line BITB_L<7:0> is transferred to the global data line GDL<7:0> as output data.

That is, in a second period of data sensing, data of the cache latches located on the first column of the second repair cache group 440 are output. Subsequently, at a time t19, the second cross repair signal EN_CR_H is disabled, and the first enable signal EN0_L is enabled. Thus, the same operation as the timing diagram of FIG. 15 is performed after the time t19. That is, data of the second repair cache group 440 is not output, but data of the first main cache group 410 is output.

As described above, in the cache buffer 160 in accordance with embodiments of the present disclosure, the MUX circuits in the cross repair operation are configured in one stage, and thus it is advantageous to design a margin for timing variation. Accordingly, reliability can be improved in a high-speed operation of the cache buffer 160 and the semiconductor memory device 100 having the same.

Figure 22:
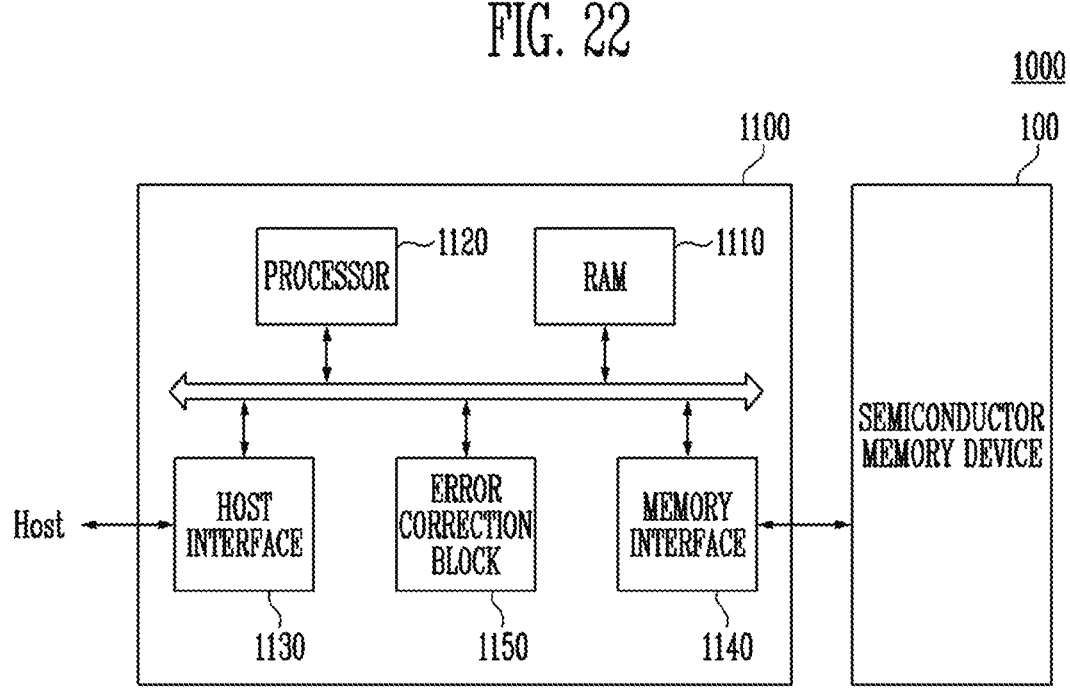
FIG. 22 is a block diagram illustrating a memory system including the semiconductor memory device of FIG. 2 in accordance with an embodiment of the present disclosure.

FIG. 22 is a block diagram illustrating a memory system including the semiconductor memory device 100 of FIG. 2.

Referring to FIG. 22, the memory system 1000 includes a semiconductor memory device 100 and a controller 1100.

The semiconductor memory device 100 may be configured and operated as described with reference to FIGS. 1 to 21. Common description of such device is thus omitted here.

The controller 1100 is coupled to a host (Host) and the semiconductor memory device 100. The controller 1100 is configured to access the semiconductor memory device 100 in response to a request from the host. For example, the controller 1100 is configured to control read, write, erase, and background operations of the semiconductor memory device 100. The controller 1100 is configured to provide an interface between the semiconductor memory device 100 and the host. The controller 1100 is configured to drive firmware for controlling the semiconductor memory device 100.

The controller 1100 includes a random access memory (RAM) 1110, a processor 1120, a host interface 1130, a memory interface 1140, and an error correction block 1150. The RAM 1110 is used as at least one of a working memory of the processor 1120, a cache memory between the semiconductor memory device 100 and the host, and a buffer memory between the semiconductor memory device 100 and the host. The processor 1120 controls overall operations of the controller 1100.

The host interface 1130 includes a protocol for exchanging data between the host and the controller 1100. In an embodiment, the controller 1100 is configured to communicate with the host through at least one of various interface protocols such as a Universal Serial Bus (USB) protocol, a Multi-Media Card (MMC) protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, and a private protocol.

The memory interface 1140 interfaces with the semiconductor memory device 100. For example, the memory interface 1140 may include a NAND interface or a NOR interface.

The error correction block 1150 is configured to detect and correct an error of data received from the semiconductor memory device 100 by using an error correction code (ECC).

The controller 1100 and the semiconductor memory device 100 may be integrated into one semiconductor device. In an exemplary embodiment, the controller 1100 and the semiconductor memory device 100 may be integrated into one semiconductor device, to constitute a memory card. For example, the controller 1100 and the semiconductor memory device 100 may be integrated into one semiconductor device, to constitute a memory card such as a PC card (Personal Computer Memory Card International Association (PCMCIA)), a Compact Flash (CF) card, a Smart Media Card (SM or SMC), a memory stick, a Multi-Media Card (MMC, RS-MMC or MMCmicro), an SD Card (SD, miniSD, microSD or SDHC), or a Universal Flash Storage (UFS).

The controller 1100 and the semiconductor memory device 100 may be integrated into one semiconductor device to constitute a semiconductor drive (solid state drive (SSD)). The semiconductor drive SSD includes a storage device configured to store data in a semiconductor memory. If the memory system 1000 is used as the semiconductor drive SSD, the operating speed of the host coupled to the memory system 1000 can be remarkably improved.

As another example, the memory system 1000 may be provided as one of various components of an electronic device such as a computer, an Ultra Mobile PC (UMPC), a workstation, a net-book, a Personal Digital Assistant (PDA), a portable computer, a web tablet, a wireless phone, a mobile phone, a smart phone, an e-book, a Portable Multimedia Player (PMP), a portable game console, a navigation system, a black box, a digital camera, a 3-dimensional television, a digital audio recorder, a digital audio player, a digital picture recorder, a digital picture player, a digital video recorder, a digital video player, a device capable of transmitting/receiving information in a wireless environment, one of various electronic devices that constitute a home network, one of various electronic devices that constitute a computer network, one of various electronic devices that constitute a telematics network, an RFID device, or one of various components that constitute a computing system.

In an embodiment, the semiconductor memory device 100 or the memory system 1000 may be packaged in various forms. For example, the semiconductor memory device 100 or the memory system 1000 may be packaged in a manner such as Package On Package (PoP), Ball Grid Arrays (BGAs), Chip Scale Packages (CSPs), Plastic Leaded Chip Carrier (PLCC), Plastic Dual In-line Package (PDIP), die in Waffle pack, die in wafer form, Chip On Board (COB), CERamic Dual In-line Package (CERDIP), plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), Thin Quad Flat Pack (TQFP), System In Package (SIP), Multi-Chip Package (MCP), Wafer-level Fabricated Package (WFP), or Wafer-level processed Stack Package (WSP).

Figure 23:
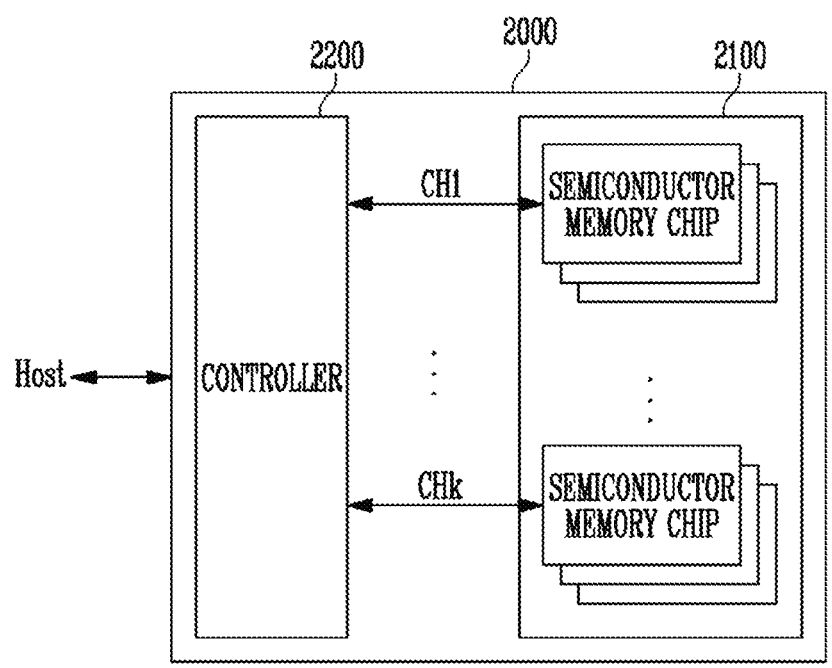
FIG. 23 is a block diagram illustrating an application example of the memory system of FIG. 22 in accordance with an embodiment of the present disclosure.

FIG. 23 is a block diagram illustrating an application example 2000 of the memory system 1000 of FIG. 22.

Referring to FIG. 23, the memory system 2000 includes a semiconductor memory device 2100 and a controller 2200. The semiconductor memory device 2100 includes a plurality of semiconductor memory chips. The plurality of semiconductor memory chips are divided into a plurality of groups.

FIG. 23 illustrates that the plurality of groups communicate with the controller 2200 through first to kth channels CH1 to CHk. Each semiconductor memory chip may be configured and operated identically to the semiconductor memory device 100 described with reference to FIG. 2.

Each group is configured to communicate with the controller 2200 through one common channel. The controller 2200 is configured identically to the controller 1100 described with reference to FIG. 22. The controller 2200 is configured to control the plurality of memory chips of the semiconductor memory device 2100 through the plurality of channels CH1 to CHk.

In FIG. 23, a case where a plurality of semiconductor memory chips of one group are coupled to one channel is described. However, in another embodiment, the memory system 2000 may be modified such that one semiconductor memory chip is coupled to one channel.

Figure 24:
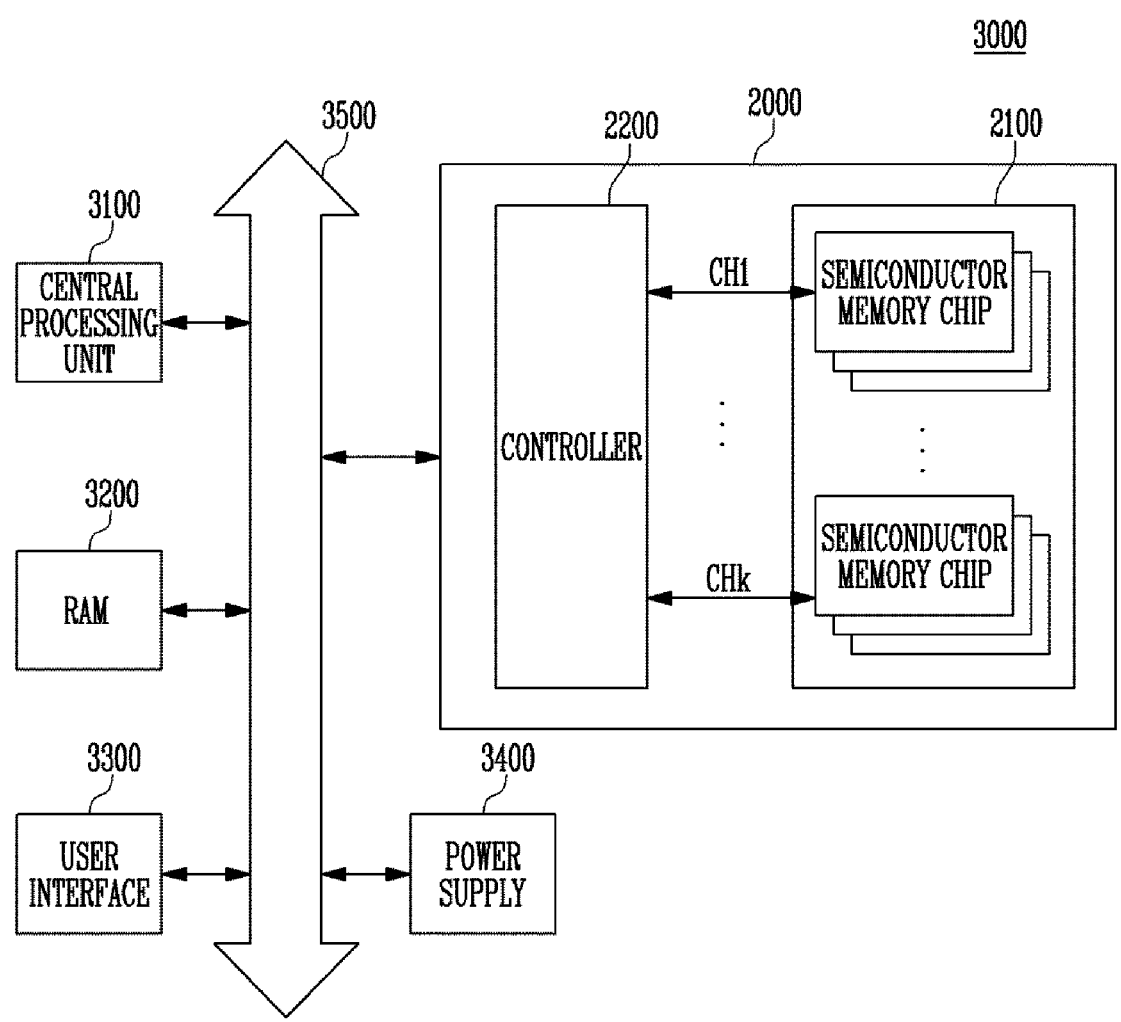
FIG. 24 is a block diagram illustrating a computing system including the memory system described with reference to FIG. 23 in accordance with an embodiment of the present disclosure.

FIG. 24 is a block diagram illustrating a computing system 3000 including the memory system 2000 described with reference to FIG. 23.

Referring to FIG. 24, the computing system 3000 includes a central processing unit (CPU) 3100, a RAM 3200, a user interface 3300, a power supply 3400, a system bus 3500, and a memory system 2000.

The memory system 2000 is electrically coupled to the CPU 3100, the RAM 3200, the user interface 3300, and the power supply 3400 through the system bus 3500. Data supplied through user interface 3300 or data processed by the CPU 3100 are stored in the memory system 2000.

FIG. 24 illustrates that the semiconductor memory device 2100 is coupled to the system bus 3500 through the controller 2200. However, the semiconductor memory device 2100 may be directly coupled to the system bus 3500. The function of the controller 2200 may be performed by the CPU 3100 and the RAM 3200.

FIG. 24 illustrates that the memory system 2000 described with reference to FIG. 23 is provided. However, the memory system 2000 may be replaced by the memory system 1000 described with reference to FIG. 22. In an embodiment, the computing system 3000 may be configured to include both of the memory systems 1000 and 2000 described with reference to FIGS. 22 and 23.

In accordance with embodiments of the present disclosure, a cache buffer capable of flexibly performing a repair operation is provided.

Further, in accordance with embodiments of the present disclosure, a semiconductor memory device capable of flexibly performing a repair operation is provided.

Various embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present disclosure as set forth in the following claims.

What is claimed is:

1. A cache buffer coupled to a page buffer, the cache buffer comprising:
a first cache group corresponding to a first area of a memory cell array;
a second cache group corresponding to a second area of the memory cell array;
a selector coupled to the first cache group and the second cache group; and
an input/output (I/O) controller coupled to the selector and configured to output data to the first cache group and the second cache group, or receive data input from the first cache group and the second cache group,
wherein the selector:
performs normal repair operation by transferring data received through a first data line to the first cache group and transferring data received through a second data line to the second cache group; and
performs cross repair operation by transferring data received through the first data line to the second cache group and transferring data received through the second data line to the first cache group.

2. The cache buffer of claim 1,
wherein the first area includes a first main area and a first repair area, and the second area includes a second main area and a second repair area,
wherein the first cache group includes a first main cache group corresponding to the first main area and a first repair cache group corresponding to the first repair area, and
wherein the second cache group includes a second main cache group corresponding to the second main area and a second repair cache group corresponding to the second repair area.

3. The cache buffer of claim 2, wherein the selector includes:
a first main selector coupled between the first main cache group and the I/O controller;
a second main selector coupled between the second main cache group and the I/O controller; and
a repair selector coupled between the first and second repair cache groups and the I/O controller.

4. The cache buffer of claim 3,
wherein the first data line includes a first bit input/output (I/O) line, and the second data line includes a second bit input/output (I/O) line,
wherein the first main cache group and the first main selector are coupled to a first local input/output (I/O) line, and the first main selector and the I/O controller are coupled to the first bit I/O line, and
wherein the second main cache group and the second main selector are coupled to a second local input/output (I/O) line, and the second main selector and the I/O controller are coupled to the second bit I/O line.

5. The cache buffer of claim 4,
wherein the first repair cache group and the repair selector are coupled to a first repair line, and the second repair cache group and the repair selector are coupled to a second repair line, and
wherein the repair selector and the I/O controller are coupled to the first bit I/O line and the second bit I/O line.

6. The cache buffer of claim 5, wherein, in a normal operation,
the repair selector is deactivated, and the first main selector and the second main selector are activated, and
the first local I/O line is coupled to the first bit I/O line, and the second local I/O line is coupled to the second bit I/O line.

7. The cache buffer of claim 5, wherein, in a normal repair operation on the first main cache group,
the first main selector is deactivated, and the second main selector is activated, and
the repair selector couples the first repair line and the first bit I/O line.

8. The cache buffer of claim 5, wherein, in a normal repair operation on the second main cache group,
the first main selector is activated, and the second main selector is deactivated, and
the repair selector couples the second repair line and the second bit I/O line.

9. The cache buffer of claim 5, wherein, in a cross repair operation on the second main cache group,
the first main selector is activated, and the second main selector is deactivated, and
the repair selector couples the first repair line and the second bit I/O line.

10. The cache buffer of claim 5, wherein, in a cross repair operation on the first main cache group, the first main selector is deactivated, and the second main selector is activated, and the repair selector couples the second repair line and the first bit I/O line.

11. The cache buffer of claim 5, wherein the repair selector includes:
a first select circuit coupled between the first repair line and the first bit I/O line;
a second select circuit coupled between the second repair line and the second bit I/O line; and
a cross select circuit coupled between the first repair line and the second repair line.

12. The cache buffer of claim 11, wherein, in a normal repair operation on the first main cache group, the first select circuit couples the first repair line and the first bit I/O line based on a first repair enable signal, and
wherein, in a normal repair operation on the second main cache group, the second select circuit couples the second repair line and the second bit I/O line based on a second repair enable signal.

13. The cache buffer of claim 11, wherein, in a cross repair operation on the first main cache group, the first select circuit and the cross select circuit couple the second repair line and the first bit I/O line, respectively based on a first repair enable signal and a first cross repair enable signal.

14. The cache buffer of claim 11, wherein, in a cross repair operation on the second main cache group, the second select circuit and the cross select circuit couple the first repair line and the second bit I/O line, respectively based on a second repair enable signal and a second cross repair enable signal.

15. The cache buffer of claim 5, wherein the repair selector includes:
a first normal repair select circuit configured to couple the first repair line and the first bit I/O line based on the first repair enable signal;
a second normal repair select circuit configured to couple the second repair line and the second bit I/O line based on the second repair enable signal;
a first cross repair select circuit configured to couple the first repair line and the second bit I/O line based on the first cross repair enable signal; and
a second cross repair select circuit configured to couple the second repair line and the first bit I/O line based on the second cross repair enable signal.

16. The cache buffer of claim 15, wherein the first normal repair select circuit includes a transistor coupled between the first repair line and the first bit I/O line, wherein the transistor is configured to be turned on by the first repair enable signal.

17. The cache buffer of claim 15, wherein the second normal repair select circuit includes a transistor coupled between the second repair line and the second bit I/O line, wherein the transistor is configured to be turned on by the first repair enable signal.

18. The cache buffer of claim 15, wherein the first cross repair select circuit includes a transistor coupled between the first repair line and the second bit I/O line, wherein the transistor is configured to be turned on by the first cross repair enable signal.

19. The cache buffer of claim 15, wherein the second cross repair select circuit includes a transistor coupled between the second repair line and the first bit I/O line, wherein the transistor is configured to be turned on by the second cross repair enable signal.

20. A memory device comprising:
a memory cell array including a plurality of memory cells;
a page buffer configured to perform a program operation or read operation on the memory cell array; and
a cache buffer coupled to the page buffer,
wherein the cache buffer includes:
a first cache group corresponding to a first area of the memory cell array;
a second cache group corresponding to a second area of the memory cell array;
a selector coupled to the first cache group and the second cache group; and
an input/output (I/O) controller coupled to the selector and configured to output data to the first cache group and the second cache group or receive data input from the first cache group and the second cache group,
wherein the selector:
performs normal repair operation by transferring data received through a first data line to the first cache group and transferring data received through a second data line to the second cache group; and
performs cross repair operation by transferring data received through the first data line to the second cache group and transferring data received through the second data line to the first cache group.

21. The memory device of claim 20,
wherein the first area includes a first main area and a first repair area, and the second area includes a second main area and a second repair area,
wherein the first cache group includes a first main cache group corresponding to the first main area and a first repair cache group corresponding to the first repair area, and
wherein the second cache group includes a second main cache group corresponding to the second main area and a second repair cache group corresponding to the second repair area.

22. The memory device of claim 21, wherein the selector includes:
a first main selector coupled between the first main cache group and the I/O controller;
a second main selector coupled between the second main cache group and the I/O controller; and
a repair selector coupled between the first and second repair cache groups and the I/O controller.

23. A cache buffer coupled to a memory cell array, the cache buffer comprising:
a main cache unit configured to cache data of a main memory area within the memory cell array;
a first repair cache unit configured to cache data of a first repair memory area within the memory cell array;
a second repair cache unit configured to cache data of a second repair memory area within the memory cell array; and
an I/O control component configured to:
transfer, when the main memory area is available, data through a first path between the main cache unit and an external entity;
change the first path to a second path between the first repair cache unit and the external entity during a normal repair operation performed to repair the main memory area with the first repair memory area; and
change the first path to a third path between the second repair cache unit and the external entity during a cross repair operation performed to repair the main memory area with the second repair memory area.

* * * * *